(12) United States Patent
Kwak

(10) Patent No.: US 11,501,149 B2
(45) Date of Patent: Nov. 15, 2022

(54) MEMORY DEVICE INCLUDING NEURAL NETWORK PROCESSING CIRCUIT

(71) Applicant: SK hynix Inc., Gyeonggi-do (KR)

(72) Inventor: Chang-Min Kwak, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 366 days.

(21) Appl. No.: 16/868,181

(22) Filed: May 6, 2020

(65) Prior Publication Data

US 2021/0150318 A1  May 20, 2021

(30) Foreign Application Priority Data

Nov. 18, 2019  (KR) .......................... 10-2019-0147555

(51) Int. Cl.
| | |
|---|---|
| *G06N 3/06* | (2006.01) |
| *G06N 3/04* | (2006.01) |
| *G06F 3/06* | (2006.01) |
| *G06F 12/02* | (2006.01) |
| *G11C 7/10* | (2006.01) |
| *G06N 3/063* | (2006.01) |

(52) U.S. Cl.
CPC .............. *G06N 3/063* (2013.01); *G06N 3/04* (2013.01)

(58) Field of Classification Search
CPC ................................. G06N 3/063; G06N 3/04
See application file for complete search history.

(56) References Cited

U.S. PATENT DOCUMENTS

| | | | |
|---|---|---|---|
| 2019/0130959 A1* | 5/2019 | Moon ................... | G11C 11/406 |
| 2019/0180183 A1 | 6/2019 | Diamant et al. | |
| 2019/0215472 A1* | 7/2019 | Lee ...................... | H04N 5/3696 |
| 2019/0370169 A1* | 12/2019 | Amato ................ | G06F 12/0246 |

FOREIGN PATENT DOCUMENTS

| | | |
|---|---|---|
| KR | 10-2018-0062910 | 6/2018 |
| KR | 10-1902658 | 9/2018 |
| KR | 10-2019-0018888 | 2/2019 |

\* cited by examiner

*Primary Examiner* — Getente A Yimer
(74) *Attorney, Agent, or Firm* — IP & T Group LLP

(57) ABSTRACT

A memory device comprising: N cell array regions, a computation processing block suitable for generating computation-completion data by performing a network-level operation on input data, the network-level operation indicating an operation of repeating a layer-level operation M times in a loop, the layer-level operation indicating an operation of performing N neural network computations in parallel, a data operation block suitable for storing the input data and (M*N) pieces of neural network processing information in the N cell array regions, and outputting the computation-completion data through the data transfer buffer, and an operation control block suitable for controlling the computation processing block and the data operation block.

19 Claims, 14 Drawing Sheets

FIG. 3

| W1 | |
|---|---|
| L1 | 10 |
| L2 | 2 |
| L3 | 4 |
| L4 | 5 |
| ⋮ | ⋮ |
| LM | 11 |

| W2 | |
|---|---|
| L1 | 10 |
| L2 | 2 |
| L3 | 4 |
| L4 | 5 |
| ⋮ | ⋮ |
| LM | 11 |

· · ·

| WN | |
|---|---|
| L1 | 10 |
| L2 | 2 |
| L3 | 4 |
| L4 | 5 |
| ⋮ | ⋮ |
| LM | 11 |

| S1 | |
|---|---|
| L1 | 0,1,3,5 |
| L2 | 1,3,7,8 |
| L3 | 2,1,4 |
| L4 | 3,5 |
| ⋮ | ⋮ |
| LM | n,0,2,6 |

| S2 | |
|---|---|
| L1 | 0,1,3,5 |
| L2 | 1,3,7,8 |
| L3 | 2,1,4 |
| L4 | 3,5 |
| ⋮ | ⋮ |
| LM | n,0,2,6 |

· · ·

| SN | |
|---|---|
| L1 | 0,1,3,5 |
| L2 | 1,3,7,8 |
| L3 | 2,1,4 |
| L4 | 3,5 |
| ⋮ | ⋮ |
| LM | n,0,2,6 |

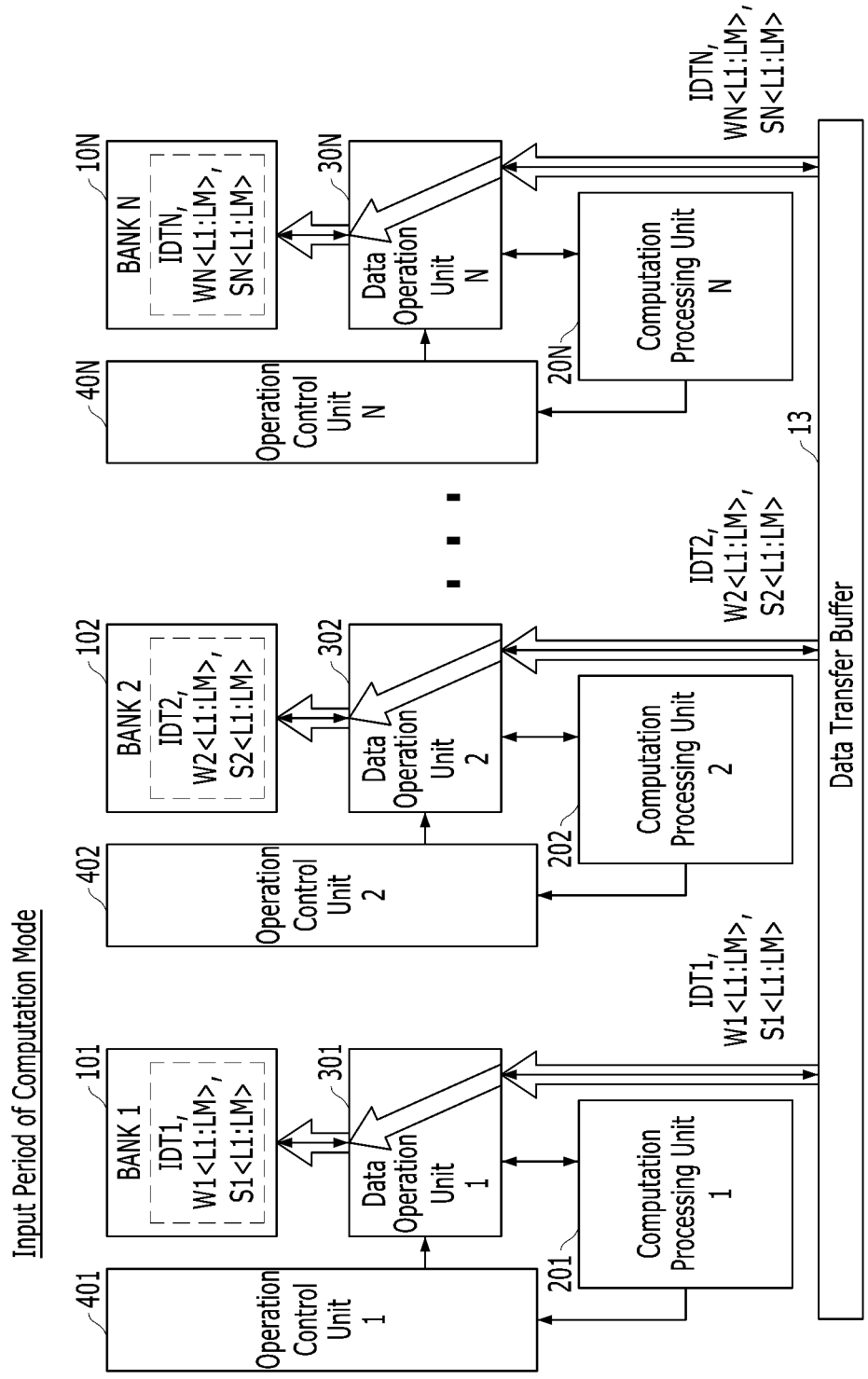

MEMORY DEVICE INCLUDING NEURAL NETWORK PROCESSING CIRCUIT

CROSS-REFERENCE TO RELATED APPLICATION

This application claims priority under 35 U.S.C. § 119 to Korean Patent Application No. 10-2019-0147555, filed on Nov. 18, 2019, which is incorporated herein by reference in its entirety.

BACKGROUND

1. Field

Exemplary embodiments relate to a memory system, and more particularly, to a memory device including a neural network processing circuit therein.

2. Discussion of the Related Art

A neural network is configured by modeling neurons of a human brain, and is also referred to as an ANN (Artificial Neural Network) with emphasis on the fact that neurons are not actual neurons.

A neural network processing operation is a basic technique used for a Convolutional Neural Network (CNN) or a Recurrent Neural Network (RNN) which corresponds to a deep learning technique among machine learning techniques. The neural network processing operation may be utilized for processing Multiple Layer Perception (MLP).

Referring to FIG. 1, a neural network for processing MLP may include a plurality of layers 1 to 5, one of which may include a plurality of neurons. That is, each of the neurons may be mathematically modeled, one layer 1, 2, 3, 4 or 5 may be configured by grouping the plurality of neurons according to a desired algorithm, and the neural network may be configured by grouping the plurality of layers 1 to 5 according to a desired algorithm.

In general, the layer 1 at the start may be referred to as 'input layer', the layer 5 at the end may be referred to as 'output layer', and the layer(s) between the input layer 1 and the output layer 5 (layers 2 to 4 in this example) may be referred to as 'hidden layers'.

Neurons included in different layers adjacent to each other may be connected in various ways through synapses, and a weight may be given to each of the synapses. Furthermore, the values of the neurons in the input layer 1 may be decided according to input data. Furthermore, the values of the neurons in each of the hidden layers 2 to 4 and the output layer 5 may be computed according to the neurons and synapses in the previous layer.

SUMMARY

Various embodiments are directed to a memory device including a neural network processing circuit capable of performing neural network processing.

In an embodiment, a memory device may include: N cell array regions; a computation processing block suitable for generating computation-completed data by performing a network-level operation on input data during a computation period of a computation mode, the network-level operation indicating an operation of repeating a layer-level operation M times in a loop, the layer-level operation indicating an operation of loading N pieces of neural network processing information in parallel from the N cell array regions and performing N neural network computations in parallel; a data operation block suitable for storing the input data and (M*N) pieces of neural network processing information, inputted through a data transfer buffer, in the N cell array regions in an input period, and outputting the computation-completed data through the data transfer buffer in an output period; and an operation control block suitable for controlling entry into and exit from the input period, the computation period and the output period and controlling the computation processing block and the data operation block, in response to a command and address inputted through an input buffer, where N and M may be natural numbers equal to or more than 2.

In a normal mode, the data operation block stores data inputted through the data transfer buffer in the N cell array regions during a write operation, and may read data of the N cell array regions and outputs the read data through the data transfer buffer during a read operation, and the operation control block may control entry into and exit from the normal mode and the data operation block in response to the command and address inputted through the input buffer.

The (M*N) pieces of neural network processing information may include (M*N) pieces of weight information and (M*N) pieces of computation information, and the operation control block may control the data operation block to store M pieces of weight information and M pieces of computation information in the respective N cell array regions in the input period.

The operation control block may enter the input period in response to a computation input command inputted through the input buffer, and may control the data operation block to store the input data, the M pieces of weight information and the M pieces of computation information in the respective N cell array regions in response to an address inputted through the input buffer.

The operation control block may exit the input period and then may enter the computation period in response to a computation start command inputted through the input buffer, may control the layer-level operation and the network-level operation in response to an address inputted through the input buffer, and may control the data operation block to store the computation-completed data in the N cell array regions in response to a computation completion signal transferred from the computation processing block.

The operation control block may exit the computation period and then may enter the output period in response to a computation completion command inputted through the input buffer, and may control the data operation block to read the computation-completed data from the N cell array regions in response to an address inputted through the input buffer, and may output the read computation-completed data through the data transfer buffer.

After entering the computation period, the operation control block may repeat a loading operation M times to correspond to the network-level operation, the loading operation indicating an operation of controlling the data operation block to read N pieces of weight information and N pieces of computation information, among the (M*N) pieces of weight information and the (M*N) pieces of computation information stored in the N cell array regions, in parallel from the N cell array regions so as to correspond to the layer-level operation, and then may load the read information to the computation processing block.

The operation control block may perform the first loading operation in response to the entry into the computation period, and may perform the second and $M^{th}$ loading operations in response to intermediate completion signals transferred from the computation processing block, respectively.

The input data may include N pieces of first input data, and the computation-completed data may include N pieces of first computation-completed data, after entering the input period, the operation control block may control the data operation block to store the first input data in the respective N cell array regions by one first input data.

The operation control block may control the data operation block to: load the N pieces of first input data, read in parallel from the respective N cell array regions, to the computation processing block in response to the entry into the computation period, and store the N pieces of first computation-completed data in the respective N cell array regions by one first computation-completed data when the computation completion signal and the N pieces of first computation-completed data are outputted from the computation processing block.

The operation control block may control the data operation block to: read, in response to entry into the output period, the N pieces of first computation-completed data in parallel from the N cell array regions, and output the read N pieces of first computation-completed data through the data transfer buffer.

The computation processing block may generate N pieces of loop data by performing N neural network computations, included in the first layer-level operation, in parallel on the N pieces of first input data loaded in response to the entry into the computation period, during each of the second to $M^{th}$ layer-level operations, the computation processing block may load the N pieces of loop data, generated as the results of the previous layer-level operation, in the current layer-level operation, and may perform the N neural network computations in parallel, the computation processing block may output the N pieces of loop data, generated as the result of the $M^{th}$ layer-level operation, as the N pieces of first computation-completed data, which are the results of the network-level operation, to the data operation block.

The computation processing block may count the number of times that the layer-level operation is completed, until the counting value may become (M−1), the computation processing block may generate the intermediate completion signal whenever the counting value is increased by 1 and may output the intermediate completion signal to the operation control block, when the counting value becomes M, the computation processing block may generate the computation completion signal and may output the computation completion signal to the operation control block.

The input data may include (K*N) pieces of second input data, and the computation-completed data may include (K*N) pieces of second computation-completed data, after entering the input period, the operation control block may control the data operation block to store the K pieces of second input data in each of the N cell array regions, the computation processing block may generate N pieces of second computation-completed data among the (K*N) pieces of second computation-completed data by performing one network-level operation on N pieces of second input data among the (K*N) pieces of second input data, and may generate the (K*N) pieces of second computation-completed data by performing an expanded network-level operation on the (K*N) pieces of second input data, the expanded network-level operation indicating an operation of performing the network-level operation K times in a row during the computation period, where K may be a natural number equal to or more than 2.

After entering the computation period, the operation control block may repeat an expanded loading operation K times to correspond to the expanded network-level operation, the expanded loading operation indicating an operation of controlling the data operation block to load the N pieces of second input data, read in parallel from the N cell array regions so as to correspond to the network-level operation, to the computation processing block, when the computation completion signal and the N pieces of second computation-completed data of the (K*N) second computation-completed data are outputted from the computation processing block in response to the network-level operation, the operation control block may repeat an expanded storing operation K times to correspond to the expanded network-level operation, the expanded storing operation indicating an operation of controlling the data operation block to store one second computation-completed data in each of the N cell array regions.

The operation control block may repeat an expanded read operation K times N and may repeat an expanded output operation K times, the expanded read operation may indicate an operation of reading N pieces of second computation-completed data in parallel from the N cell array regions in response to the entry into the output period, and the expanded output operation may indicate an operation of controlling the data operation block to output the N pieces of second computation-completed data, read through the expanded read operation, through the data transfer buffer.

After entering the computation period, the computation processing block may generate N pieces of data by performing N neural network computations, included in the first layer-level operation, in parallel on the loaded N pieces of second input data among the (K*N) second input data, during each of the second to $M^{th}$ layer-level operations, the computation processing block may load the N pieces of data, generated as the results of the previous layer-level operation, in the current layer-level operation, and may perform the N neural network computations in parallel, the computation processing block may output the N pieces of data, generated as the result of the $M^{th}$ layer-level operation, as the N pieces of second computation-completed data which are the results of the network-level operation, to the data operation block.

The computation processing block may count the number of times that the layer-level operation is completed, until the counting value may become (M−1), the computation processing block may generate the intermediate completion signal whenever the counting value is increased by 1 and may output the intermediate completion signal to the operation control block, when the counting value becomes M, the computation processing block may generate the computation completion signal, may output the computation completion signal to the operation control block, and may reset the counting value.

The computation processing block may include N computation processing units corresponding to the respective N cell array regions, each of the N computation processing unit may include: a data loading unit suitable for loading the weight information and the computation information inputted through the data operation block and any of the data inputted through the data operation block and internal feedback loop data; a computation unit suitable for performing neural network computation on the data loaded from the data loading unit and data transferred from the other (N−1) computation processing units except the corresponding computation unit, using the weight information and the computation information, and generating a result; a selection transfer unit suitable for feeding the result as the loop data back to the data loading unit when a value indicative of the result is equal to or more than a reference value, and generating the loop data fixed to a specific value and feeding the loop data back to the data loading unit when the value of the result is less than the reference value; and a counting unit suitable for counting the number of times that the selection transfer unit transfers the loop data to the data loading unit, generating the intermediate completion signal or the computation completion signal according to the counting value, and outputting the generated signal to the operation control block.

The data operation block may include N data operation units corresponding to the respective N cell array regions, each of the N data operation units may include: a read/write operation unit suitable for writing data to a cell array region or reading data from a cell array region in response to a first control signal inputted from the operation control block; and a path selector suitable for selecting a path of data transferred among the read/write operation unit, the data transfer buffer and the computation processing unit in response to a second control signal inputted from the operation control block.

In an embodiment, a memory device may include: N storage mediums suitable for respectively storing N pieces of input data IDT1 to IDTN, N pieces of weight information W1 to WN and N pieces of computation information S1 to SN, wherein each of the N pieces of weight information W1 to WN has M bits L1 to LM and each of the N pieces of computation information S1 to SN has M bits L1 to LM; and a computation block suitable for performing a neural network computation of iterating, to generate respective N pieces of computation-completed data CDT1 to CDTN, a layer-level operation M times on the respective N pieces of input data with sequence of the M bits of the respective N pieces of weight information and sequence of the M bits of the respective N pieces of computation information, the N storage mediums may be further suitable for respectively storing the N pieces of computation-completed data.

In accordance with the present embodiment, the neural network processing circuit may be included in the memory device, and the memory device can perform neural network processing for itself after entering the computation mode.

Furthermore, the memory banks (each including a plurality of memory cells) included in the memory device, and the neural network processing circuit can share the data input/output buffer, and control whether to active the neural network processing circuit, thereby selecting the use of the memory device.

BRIEF DESCRIPTION OF THE DRAWINGS

FIG. 3 is a diagram for describing neural network processing information used in neural network processing in accordance with an embodiment.

FIGS. 5A to 5F are diagrams for describing an example of a computation mode operation of a memory device in accordance with an embodiment.

DETAILED DESCRIPTION

Figure 1:
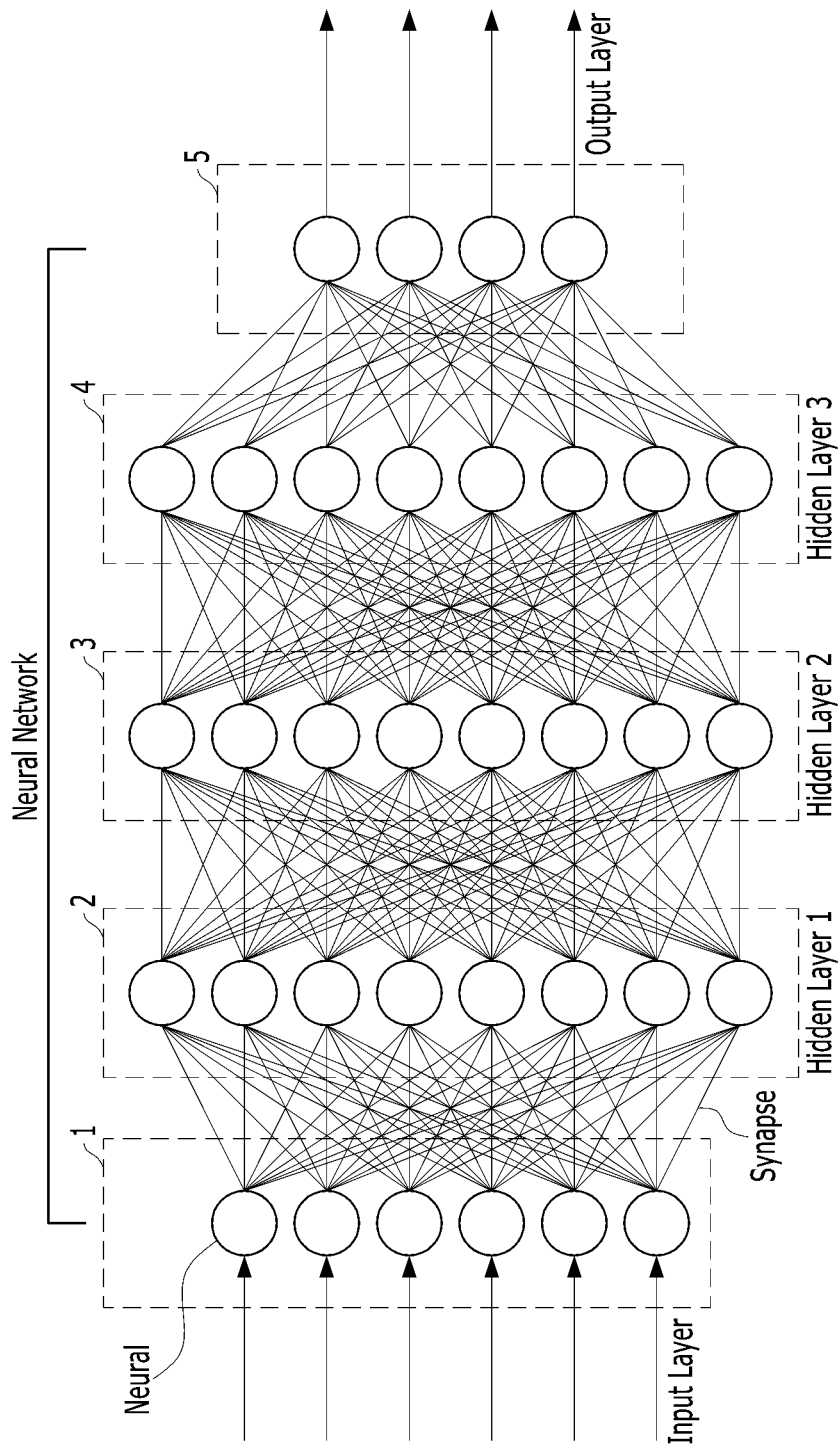
FIG. 1 is a diagram for describing neural network processing.

Various examples of the disclosure are described below in more detail with reference to the accompanying drawings. Aspects and features of the present invention, however, may be embodied in different ways to form other embodiments, including variations of any of the disclosed embodiments. Thus, the invention is not limited to the embodiments set forth herein. Rather, the described embodiments are provided so that this disclosure is thorough and complete and fully conveys the disclosure to those skilled in the art to which this invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without indicating any change in the element itself.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. Similarly, the indefinite articles "a" and "an" mean one or more, unless it is clear from the language or context that only one is intended.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the invention belongs in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure are described in detail below with reference to the accompanying drawings, wherein like numbers reference like elements.

Figure 2:
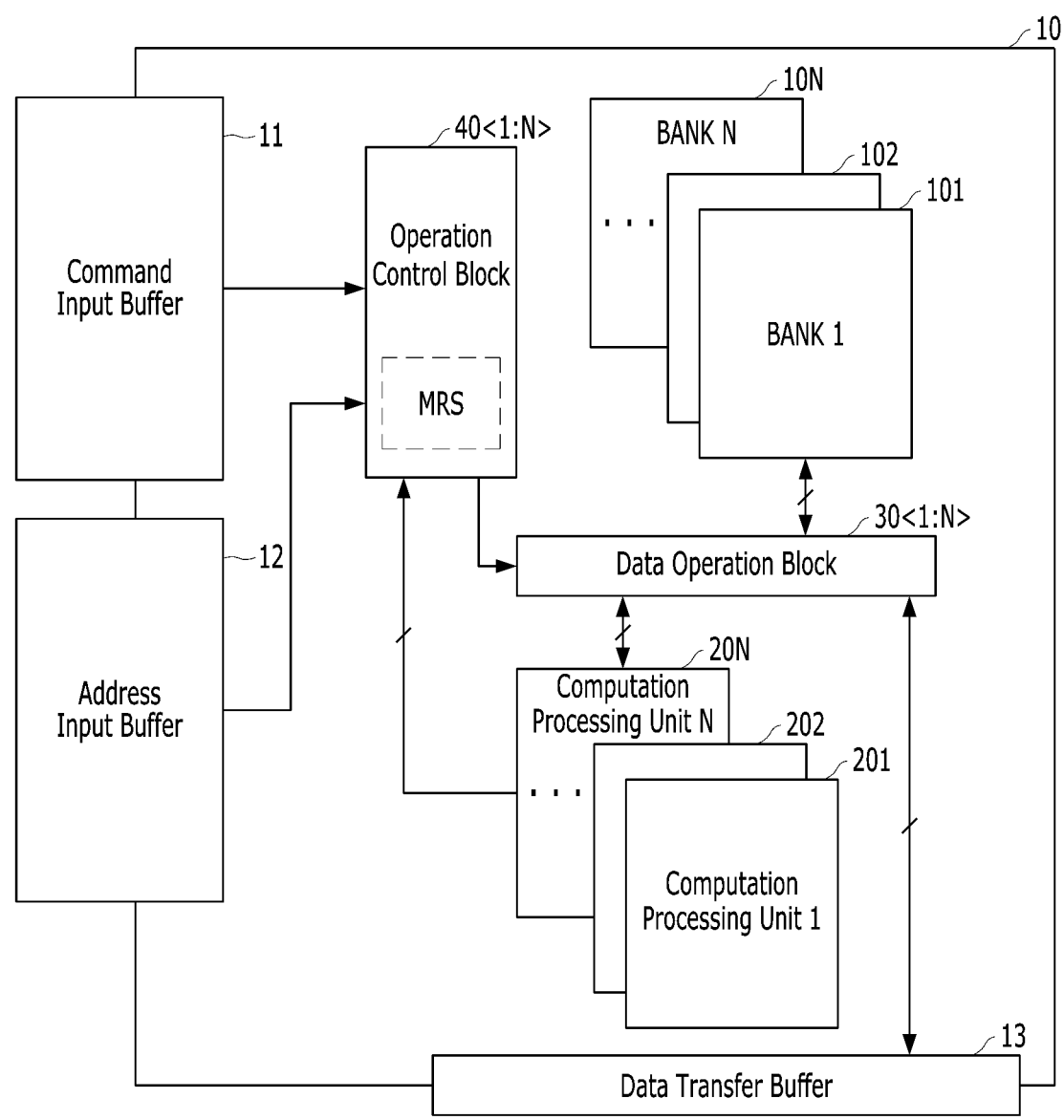
FIG. 2 is a block diagram illustrating a memory device in accordance with an embodiment.

FIG. 2 is a block diagram illustrating a memory device in accordance with an embodiment.

FIG. 3 is a diagram for describing neural network processing information used in neural network processing in accordance with an embodiment.

First, referring to FIG. 2, the memory device 10 may include N memory banks 101 to 10N, a computation processing block 20<1:N>, a data operation block 30<1:N>, an operation control block 40<1:N>, a command input buffer 11, an address input buffer 12 and a data transfer buffer 13.

Specifically, the memory device 10 may be implemented as a volatile memory device such as a DRAM (Dynamic Random Access Memory) or SRAM (Static RAM) or a nonvolatile memory device such as a ROM (Read Only Memory), MROM (Mask ROM), PROM (Programmable ROM), EPROM (Erasable ROM), EEPROM (Electrically Erasable ROM), FRAM (Ferromagnetic ROM), PRAM (Phase change RAM), MRAM (Magnetic RAM), RRAM (Resistive RAM) or flash memory.

The computation processing block 20<1:N> may generate computation-completed data by performing a 'network-level operation' on input data, the network-level operation indicating an operation of repeatedly performing a 'layer-level operation' M times in a loop, the layer-level operation indicating an operation of loading N pieces of neural network processing information in parallel from the N memory banks 101 to 10N and performing N neural network computations in parallel during a computation period of a computation mode. That is, the computation processing block 20<1:N> may generate the computation-completed data by performing the network-level operation on the input data, and the network-level operation may indicate repeatedly performing the layer-level operation M times in a loop. The computation processing block 20<1:N> may be deactivated in a normal mode, and thus perform no operations.

Referring to FIGS. 1 and 2, each of the N neural network computations included in the layer-level operation performed by the computation processing block 20<1:N> may correspond to one neuron. A single layer-level operation performed by the computation processing block 20<1:N> may correspond to one layer 1, 2, 3, 4 or 5. Therefore, when the computation processing block 20<1:N> performs the layer-level operation, it may indicate that the computation processing block 20<1:N> performs a neural network computation operation on one layer 1, 2, 3, 4 or 5 including N neurons. Similarly, when the computation processing block 20<1:N> performs the network-level operation, it may indicate that the computation processing block 20<1:N> repeatedly performs the layer-level operation included in the network-level operation M times in a loop, and performs a neural network computation operation including M layers. That is, when there are neural network computation operations for five layers 1 to 5, as illustrated in FIG. 1, M may be set to 5. Here, N and M may be natural numbers larger than 2.

The data operation block 30<1:N> may store (M*N) pieces of neural network processing information and input data, inputted through the data transfer buffer 13, in the N memory banks 101 to 10N during an input period of the computation mode. The data operation block 30<1:N> may output the computation-completed data generated by the computation processing block 20<1:N> through the data transfer buffer 13 during an output period of the computation mode.

The above-described operation of the computation processing block 20<1:N> may be performed after the input data and the (M*N) pieces of neural network processing information are stored in the N memory banks 101 to 10N through the data operation block 30<1:N>. The N pieces of neural network processing information may be loaded whenever the layer-level operation is performed, and the computation-completed data are generated when the network-level operation of repeating the layer-level operation M times in a loop is performed on the input data. Therefore, the computation processing block 20<1:N> may need the (M*N) pieces of neural network processing information, in order to generate the computation-completed data by performing the network-level operation on the input data.

The data operation block 30<1:N> may store data, inputted through the data transfer buffer 13, in the N memory banks 101 to 10N during a write operation in the normal mode. The data operation block 30<1:N> may read data of the N memory banks 101 to 10N and output the read data through the data transfer buffer 13, during a read operation in the normal mode.

The operation control block 40<1:N> may include a Memory Register Set (MRS). Therefore, the operation control 40<1:N> may control entry into and exit from each input period, the computation period and the output period of the computation mode and the normal mode in response to a command inputted through the command input buffer 11 and an address inputted through the address input buffer 12, and control the computation processing block 20<1:N> and the data operation block 30<1:N>. The computation mode and the normal mode may be distinct mutually exclusive modes.

Referring to FIGS. 2 and 3, the (M*N) pieces of neural network processing information may include (M*N) pieces of weight information W1<L1:LM> to WN<L1:LM> and (M*N) pieces of computation information S1<L1:LM> to SN<L1:LM>. That is, one piece of neural network processing information may include one piece of weight information and one piece of computation information.

Referring to FIGS. 1 to 3, the configuration in which the neural network processing information includes the weight information may correspond to the configuration in which a weight is given to a synapse used to connect a plurality of neurons included in different layers adjacent to each other. Furthermore, the configuration in which the neural network processing information includes the computation information may correspond to the configuration in which each of the neurons is mathematically modeled.

Specifically, the operation control block 40<1:N> may control the data operation block 30<1:N> to store M pieces of weight information and M pieces of computation information in the respective N memory banks 101 to 10N in the input period.

For example, the operation control block 40<1:N> may control the data operation block 30<1:N> to store the first M pieces of weight information W1<L1:LM> and the first M pieces of computation information S1<L1:LM> in the first memory bank 101, and store the second M pieces of weight information W2<L1:LM> and the second M pieces of computation information S2<L1:LM> in the second memory bank 102, in the input period. In this way, the operation control block 40<1:N> may control the data operation block 30<1:N> to store the M pieces of weight information and the M pieces of computation information in the respective N memory banks 101 to 10N.

The operation control block 40<1:N> may control the data operation block 30<1:N> to read the M pieces of weight information and the M pieces of computation information from the respective N memory banks 101 to 10N, and transfer the read information to the computation processing block 20<1:N>, in the computation period.

For example, the operation control block 40<1:N> may control the data operation block 30<1:N> to read the first M pieces of weight information W1<L1:LM> and the first M pieces of computation information S1<L1:LM> from the first memory bank 101, and read the second M pieces of weight information W2<L1:LM> and the second M pieces of computation information S2<L1:LM> from the second memory bank 102, in the computation period. In this way, the operation control block 40<1:N> may control the data operation block 30<1:N> to read the M pieces of weight information and the M pieces of computation information from the respective N memory banks 101 to 10N, and transfer the read information to the computation processing block 20<1:N>.

The operation control block 40<1:N> may control the data operation block 30<1:N> to store the computation-completed data transferred from the computation processing block 20<1:N> in the N memory banks 101 to 10N in response to a computation completion signal transferred from the computation processing block 20<1:N>, after the computation processing block 20<1:N> completes the neural network computation in the computation period.

The operation control block 40<1:N> may control the data operation block 30<1:N> to read the computation-completed data from the respective N memory banks 101 to 10N and output the read data through the data transfer buffer 13, in the output period.

Figure 4:
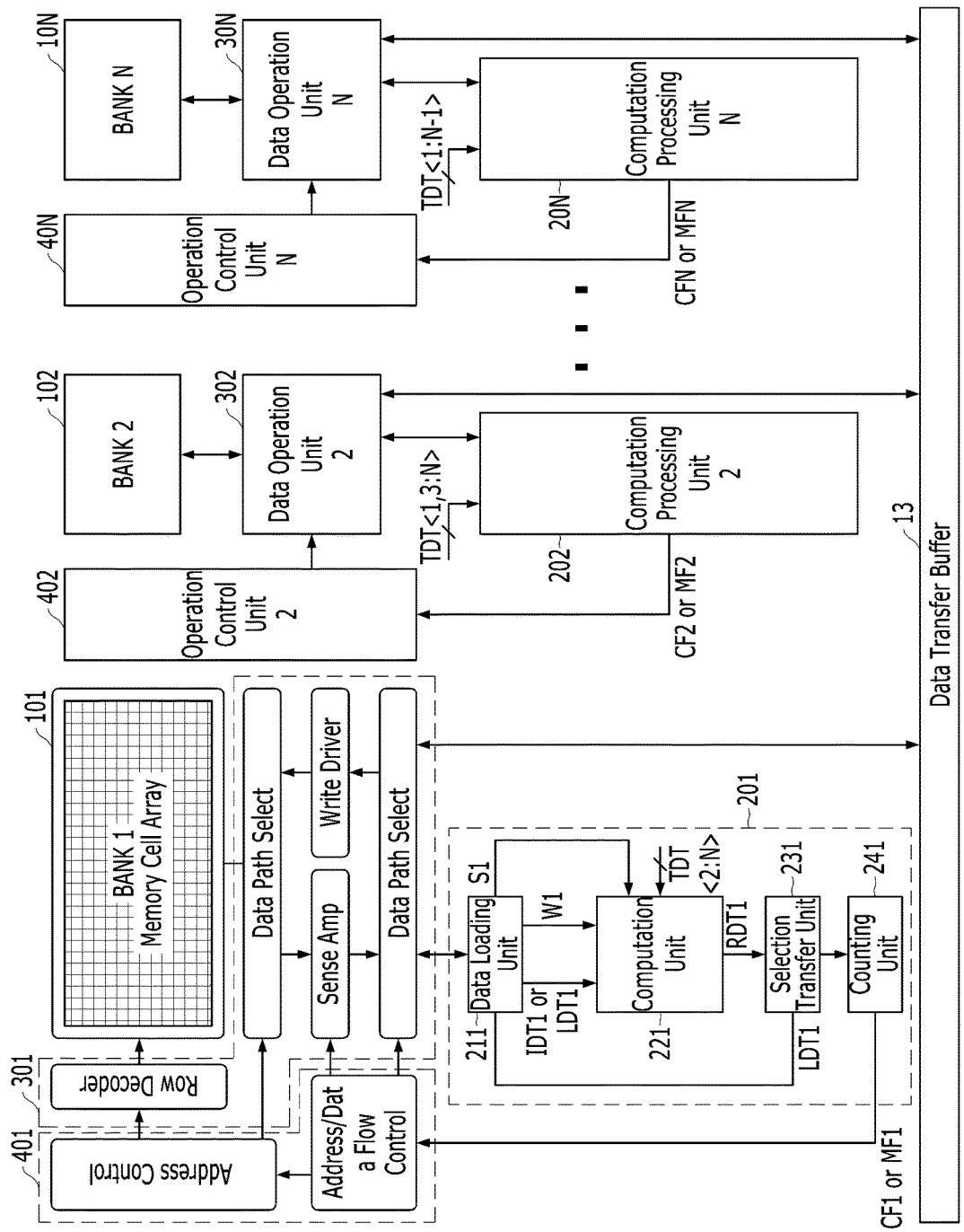
FIG. 4 is a detailed block diagram of a memory device, such as that illustrated in FIG. 2.

FIG. 4 is a detailed block diagram of the memory device illustrated in FIG. 2.

FIG. 4 illustrates the detailed configurations of the operation control block 40<1:N>, the data operation block 30<1:N> and the computation processing block 20<1:N> among the components of the memory device 10 illustrated in FIG. 2. The configuration shown in FIG. 4 is based on the supposition that the memory device 10 is a DRAM. When the memory device 10 is a different type of memory device, the detailed configuration thereof may be changed.

Specifically, each of the N memory banks 101 to 10N may include a plurality of memory cells (not illustrated) coupled in array to a plurality of word lines (not illustrated) and a plurality of bit lines (not illustrated), and each of the memory cells may store one or more bits of data therein. That is, each of the N memory banks 101 to 10N may be considered as 'cell array region' including a plurality of memory cells in array. Therefore, the term 'N memory banks' is based on the supposition that the memory device 10 is a DRAM. When the memory device 10 is a different type of memory device, the term 'N cell array regions' may be used instead of 'NJ memory banks'.

The computation processing block 20<1:N> may include N computation processing units 201 to 20N corresponding to the N memory banks 101 to 10N, respectively. The operation control block 40<1:N> may include N operation control units 401 to 40N corresponding to the N memory banks 101 to 10N, respectively, and the MRS (see FIG. 2). The data operation block 30<1:N> may include N data operation units 301 to 30N corresponding to the N memory banks 101 to 10N, respectively. Since the MRS (see FIG. 2) included in the operation control 40<1:N> is a component which may be included separately from the N operation control units 401 to 40N, the MRS is not illustrated in FIG. 4.

The N operation control units 401 to 40N may be implemented as circuits which operate in a similar manner. The N data operation units 301 to 30N may be implemented as circuits which operate in a similar manner. The N computation processing units 201 to 20N may be implemented as circuits which operate in a similar manner.

Therefore, the first operation control unit 401 of the N operation control units 401 to 40N, the first data operation unit 301 of the N data operation units 301 to 30N and the first computation processing unit 201 of the N computation processing units 201 to 20N may be selected as representative units, and the detailed configurations of the selected units will be described as follows.

The first operation control unit 401 may include an address controller and an address/data flow controller. Specifically, the first operation control unit 401 may generate various control signals for controlling the first data operation unit 301 in response to a command and address inputted through the command input buffer 11 and the address input buffer 12 and a computation processing-related signal CF or MF inputted from the first computation processing unit 201.

For example, the address controller included in the first operation control unit 401 may generate a row address and a column address in response to the address inputted through the address input buffer 12. The address/data flow controller included in the first operation control unit 401 may generate a read operation signal, a write operation signal and a path selection signal in response to the command and address inputted through the command input buffer 11 and the address input buffer 12.

The first data operation unit 301 may include a row decoder, a column decoder, a sense amp, a write driver and a data path selector. The row decoder, the column decoder, the sense amp and the write driver, which are included in the first data operation unit 301, may serve as a component for writing data to the first memory bank 101 or reading data from the first memory bank 101, i.e. a read/write operation unit. For example, the read/write operation unit included in the first data operation unit 301 may select one or more cells among the plurality of memory cells included in the first memory bank 101 and then read data from the selected one or more cells or write data to the selected cells, in response to a first control signal inputted from the first operation control unit 401, for example, a row address, a column address, a read operation signal and a write operation signal.

The data path selector included in the first data operation unit 301 may serve as a component for selecting a path of data transferred among the read/write operation unit, the data transfer buffer 13 and the first computation processing unit 201, i.e. a path selector. For example, the path selector included in the first data operation unit 301 may select a path of data transferred among the read/write operation unit, the first computation processing unit 201 and the data transfer buffer 13, in response to a second control signal inputted from the first operation control unit 401, for example, a path selection signal.

The first computation processing unit 201 may include a data loading unit 211, a computation unit 221, a selection transfer unit 231 and a counting unit 241.

The data loading unit 211 included in the first computation processing unit 201 may load weight information W1 and computation information S1 which are inputted through the first data operation unit 301 and any among data IDT1 or LDT1 of input data IDT1 inputted through the first data operation unit 301 and internal feedback loop data LDT1.

The computation unit 221 included in the first computation processing unit 201 may perform neural network computation on the data IDT1 or LDT1 loaded through the data loading unit 211 and transfer data TDT<2:N> transferred from the second to $N^{th}$ computation processing units 202 to 20N, using the weight information W1 and the computation information S1, and generate result data RDT1 as the result. For example, the computation unit 221 may generate the result data RDT1 by summing up a value, obtained by multiplying the data IDT1 or LDT1 loaded through the data loading unit 211 by the value of the weight information W1, and the values of the transfer data TDT<2:N> transferred from the second to $N^{th}$ computation processing units 202 to 20N according to the computation information S1.

When the operation in which the computation unit 221 included in the first computation processing unit 201 performs neural network computation using the transfer data TDT<2:N> transferred from the second to $N^{th}$ computation processing units 202 to 20N is generated as operations of the N computation processing units 201 to 20N, the operation may indicate that each of the N computation processing units 201 to 20N performs neural network computation using data transferred from the other (N−1) computation processing units except itself. For example, the computation unit (not illustrated) included in the second computation processing unit 202 may perform neural network computation using transfer data TDT<1, 3:N> transferred from the first and third to $N^{th}$ computation processing units 201 and 203 to 20N. Similarly, the computation unit (not illustrated) included in the $N^{th}$ computation processing unit 20N may perform neural network computation using transfer data TDT<1:N−1> transferred from the first to $(N−1)^{th}$ computation processing units 201 to 20N−1.

Referring to FIGS. 1 and 4, the operation in which each of the N computation processing units 201 to 20N performs neural network computation using the data transferred from the other (N−1) computation processing units may be an operation in which a plurality of neurons are connected in various ways through a synapse.

When the value of the result data RDT1 generated through the computation unit 221 is equal to or more than a reference value, the selection transfer unit 231 included in the first computation processing unit 201 may feed the corresponding result data RDT1 as the loop data LDT1 back to the data loading unit 211. On the other hand, when the value of the result data RDT1 generated through the computation unit 221 is less than the reference value, the selection transfer unit 231 may ignore the corresponding result data RDT1, generate the loop data LDT1 fixed to a specific value, and feed the loop data LDT1 back to the data loading unit 211. The N 'reference values' used as operation reference values of the selection transfer units included in the N computation processing units 201 to 20N, respectively, may be set by the MRS included in the operation control block 40<1:N> in advance according to the purpose of the neural network computation, and changed by a user whenever neural network computation is performed.

The counting unit 241 included in the first computation processing unit 201 may count the number of times that the selection transfer unit 231 transfers the loop data LDT1 to the data loading unit 211, generate an intermediate completion signal MF1 or a computation completion signal CF1 according to the counting value, and output the generated signal as the computation processing-related signal CF1 or MF1 to the first operation control unit 401. For example, the counting unit 241 included in the first computation processing unit 201 may generate the intermediate completion signal MF1 and output the generated intermediate completion signal MF1 to the first operation control unit 401 until the counting value obtained by counting the number of times that the selection transfer unit 231 transfers the loop data LDT1 to the data loading unit 211 becomes a predetermined value. When the counting value becomes the predetermined value, the counting unit 241 may generate the computation completion signal CF1, and output the generated computation completion signal CF1 to the first operation control unit 401.

For reference, it has been described that the computation processing units are configured to correspond one-to-one to the respective memory banks, that is, that the number of memory banks is equal to the number of computation processing units. However, the configuration may be implemented in different ways according to system or design considerations.

For example, the computation processing units may be configured to correspond to some of the memory banks, but not to correspond to the other memory banks. That is, the number of the computation processing units may be smaller than the number of the memory banks. In this case, the other memory banks which do not correspond to the computation processing units may be configured to operate only in the normal mode. The data operation units corresponding to the memory banks configured to operate only in the normal mode may not require the data path selector for selecting a transfer path of data. Similarly, the operation control units corresponding to the memory banks configured to operate only in the normal mode may not need to perform a control operation for selecting a transfer path of data.

For another example, two or more computation processing units may correspond to one memory bank. This configuration may indicate the case in which the size of data which can be read from one memory bank at a time, that is, the size of weight information and computation information is larger than the size of data which can be processed by one computation processing unit. The two or more computation processing units corresponding to one memory bank may divide data, which can be read from one memory bank at a time, into two or more data, and process the two or more data in parallel. That is, the two or more computation processing units corresponding to one memory bank may operate like one computation processing unit, even though the two or more computation processing units are physically separated from each other.

FIGS. 5A to 5F are diagrams for describing an example of a computation mode operation of the memory device in accordance with an embodiment.

FIGS. 2 to 4 and 5A to 5F may be based on the supposition that N pieces of input data IDT1 to IDTN are inputted to the memory device 10 and stored in the N memory banks 101 to 10N, respectively. Furthermore, FIGS. 2 to 4 and 5A to 5F may be based on the supposition that the computation processing block 20<1:N> generates N pieces of computation-completed data CDT1 to CDTN by repeatedly performing layer-level operations M times in a loop on the N pieces of input data IDT1 to IDTN stored in the respective N memory banks 101 to 10N, or performing one network-level operation.

Referring to FIGS. 2 to 5A, the MRS included in the operation control block 40<1:N> may enter the input period in response to a computation input command (not illustrated) inputted through the command input buffer 11.

The operation control block 40 may control the data operation block 30 to store the N pieces of input data IDT1 to IDTN, the (N*M) pieces of weight information W1<L1:LM> to WN<L1:LM> and the (N*M) pieces of computation information S1<L1:LM> to SN<L1:LM>, inputted through the data transfer buffer 13, in the N memory banks 101 to 10N in response to an address inputted through the address input buffer 12 in the input period.

Specifically, the first operation control unit 401 may control the first data operation unit 301 to store the first input data IDT1, the first M pieces of weight information W1<L1:LM> and the first M pieces of computation information S1<L1:LM>, inputted through the data transfer buffer 13, in the first memory bank 101 in the input period. Similarly, the second operation control unit 402 may control the second data operation unit 302 to store the second input data IDT2, the second M pieces of weight information W2<L1:LM> and the second M pieces of computation information S2<L1:LM>, inputted through the data transfer buffer 13, in the second memory bank 102 in the input period. In this way, the third to $N^{th}$ operation control units 403 to 40N may control the third to $N^{th}$ data operation units 303 to 30N to store the third to $N^{th}$ pieces of input data IDT3 to IDTN, the third to $N^{th}$ M pieces of weight information W3<L1:LM> to WN<L1:LM> and the third to $N^{th}$ M pieces of computation information S3<L1:LM> to SN<L1:LM>, inputted through the data transfer buffer 13, in the third to $N^{th}$ memory banks 103 to 10N, respectively, in the input period.

Referring to FIGS. 2 to 4 and 5A and 5B, the MRS included in the operation control block 40 may exit from the input period and then enter the computation period, in response to a computation start command (not illustrated) inputted through the command input buffer 11.

The operation control block 40 may control the data operation block 30 to read the N pieces of input data IDT1 to IDTN, the (N*M) pieces of weight information W1<L1:LM> to WN<L1:LM> and the (N*M) pieces of computation information S1<L1:LM> to SN<L1:LM>, stored in the N memory banks 101 to 10N and transfer the read data and information to the computation processing block 20<1:N>, in response to an address inputted through the address input buffer 12 in the computation period.

Specifically, after entering the computation period, the operation control block 40 may repeat a 'loading operation' M times to correspond to the network-level operation of the computation processing block 20<1:N>, a single loading operation corresponding to a single layer-level operation of the computation processing block 20 and indicating an operation of controlling the data operation block 30<1:N> to read N pieces of weight information W1<Lx> to WN<Lx> and N pieces of computation information S1<Lx> to SN<Lx>, among the (N*M) pieces of weight information W1<L1:LM> to WN<L1:LM> and the (N*M) pieces of computation information S1<L1:LM> to SN<L1:LM> in parallel from the N memory banks 101 to 10N and then controlling the data operation block 30 to load the read information W1<Lx> to WN<Lx> and S1<Lx> to SN<Lx> to the computation processing block 20<1:N>, where x is any number from 1 to M.

After entering the computation period, the operation control block 40<1:N> may control the data operation block 30<1:N> to read the N pieces of input data IDT1 to IDTN, stored in the N memory banks 101 to 10N, in parallel from the N memory banks 101 to 10N, and then load the read N pieces of input data IDT1 to IDTN to the computation processing block 20<1:N>.

The operation control block 40 may perform the first loading operation among the loading operations which are repeated M times to correspond to the network-level operation of the computation processing block 20<1:N>, in response to the entry the computation period. The operation control block 40<1:N> may perform the second to $M^{th}$ loading operations among the loading operations which are repeated M times to correspond to the network-level operation of the computation processing block 20<1:N>, in response to the intermediate completion signal MF<1:N> transferred from the computation processing block 20<1:N>.

When the computation completion signals CF<1:N> and the N pieces of computation-completed data CDT1 to CDTN are outputted as the result of the network-level operation by the computation processing block 20<1:N>, the operation control block 40<1:N> may control the data operation block 30<1:N> to store the N pieces of computation-completed data CDT1 to CDTN in the N memory banks 101 to 10N, respectively.

More specifically, the first operation control unit 401 may control the first data operation unit 301 to read the first input data IDT1 and the first piece of first weight information W1<L1> and the first piece of first computation information S1<L1>, stored in the first memory bank 101, and transfer the read data and information to the first computation processing unit 201, in response to the entry into the computation period. Similarly, the second operation control unit 402 may control the second data operation unit 302 to read the second input data IDT2, the second piece of first weight information W2<L1> and the second piece of first computation information S2<L1>, stored in the second memory bank 102, and transfer the read data and information to the second computation processing unit 202, in response to the entry into the computation period. In this way, the third to $N^{th}$ operation control units 403 to 40N may control the third to $N^{th}$ data operation units 303 to 30N to read the third to $N^{th}$ pieces of input data IDT3 to IDTN, the third to $N^{th}$ pieces of first weight information W3<L1> to WN<L1> and the third to $N^{th}$ pieces of first computation information S3<L1> to SN<L1>, stored in the third to $N^{th}$ memory banks 103 to 10N, respectively, and transfer the read data and information to the third to $N^{th}$ computation processing units 203 to 20N, respectively, in response to the entry into the computation period. As described above, the operation control block 40 may perform the first loading operation, among the loading operations which are repeated M times to correspond to the network-level operation of the computation processing block 20<1:N>, on the N pieces of input data IDT1 to IDTN in response to the entry into the computation period.

Then, the first operation control unit 401 may control the first data operation unit 301 to read the first piece of second weight information W1<L2> and the first piece of second computation information S1<L2>, stored in the first memory bank 101, and transfer the read information to the first computation processing unit 201, in response to the intermediate completion signal MF1 transferred from the first computation processing unit 201. Similarly, the second operation control unit 402 may control the second data operation unit 302 to read the second piece of second weight information W2<L2> and the second piece of second computation information S2<L2>, stored in the second memory bank 102, and transfer the read information to the second computation processing unit 202, in response to the intermediate completion signal MF2 transferred from the second computation processing unit 202. In this way, the third to $N^{th}$ operation control units 403 to 40N may control the third to $N^{th}$ data operation units 303 to 30N to read the third to $N^{th}$ pieces of second weight information W3<L2> to WN<L2> and the third to $N^{th}$ pieces of second computation information S3<L2> to SN<L2>, stored in the third to $N^{th}$ memory banks 103 to 10N, respectively, and transfer the read information to the third to $N^{th}$ computation processing units 203 to 20N, respectively, in response to the intermediate completion signals MF<3:N> transferred from the third to $N^{th}$ computation processing units 203 to 20N. As described above, the operation control block 40 may perform the second loading operation, among the loading operations which are repeated M times to correspond to the network-level operation of the computation processing block 20<1:N>, in response to the intermediate completion signals MF<1:N> transferred from the computation processing block 20<1:N>. The third to $M^{th}$ loading operations may be performed in the same manner as the second loading operation.

Then, when the computation completion signal CF1 and the first computation-completed data CDT1 are outputted from the first computation processing unit 201, the first operation control unit 401 may control the first data operation unit 301 to store the first computation-completed data CDT1 in the first memory bank 101. Similarly, when the computation completion signal CF2 and the second computation-completed data CDT2 are outputted from the second computation processing unit 202, the second operation control unit 402 may control the second data operation unit 302 to store the second computation-completed data CDT2 in the second memory bank 102. In this way, when the computation completion signals CF<3:N> and the third to $N^{th}$ pieces of computation-completed data CDT3 to CDTN are outputted from the third to $N^{th}$ computation processing units 203 to 20N, respectively, the third to $N^{th}$ operation control units 403 to 40N may control the third to $N^{th}$ data operation units 303 to 30N to store the third to $N^{th}$ pieces of computation-completed data CDT3 to CDTN in the third to $N^{th}$ memory banks 103 to 10N, respectively. As described above, when the computation completion signals CF<1:N> and the N pieces of computation-completed data CDT1 to CDTN are outputted as the result of the network-level operation by the computation processing block 20<1:N>, the operation control block 40<1:N> may control the data operation block 30<1:N> to store the N pieces of computation-completed data CDT1 to CDTN in the N memory banks 101 to 10N, respectively.

Figure 5B:
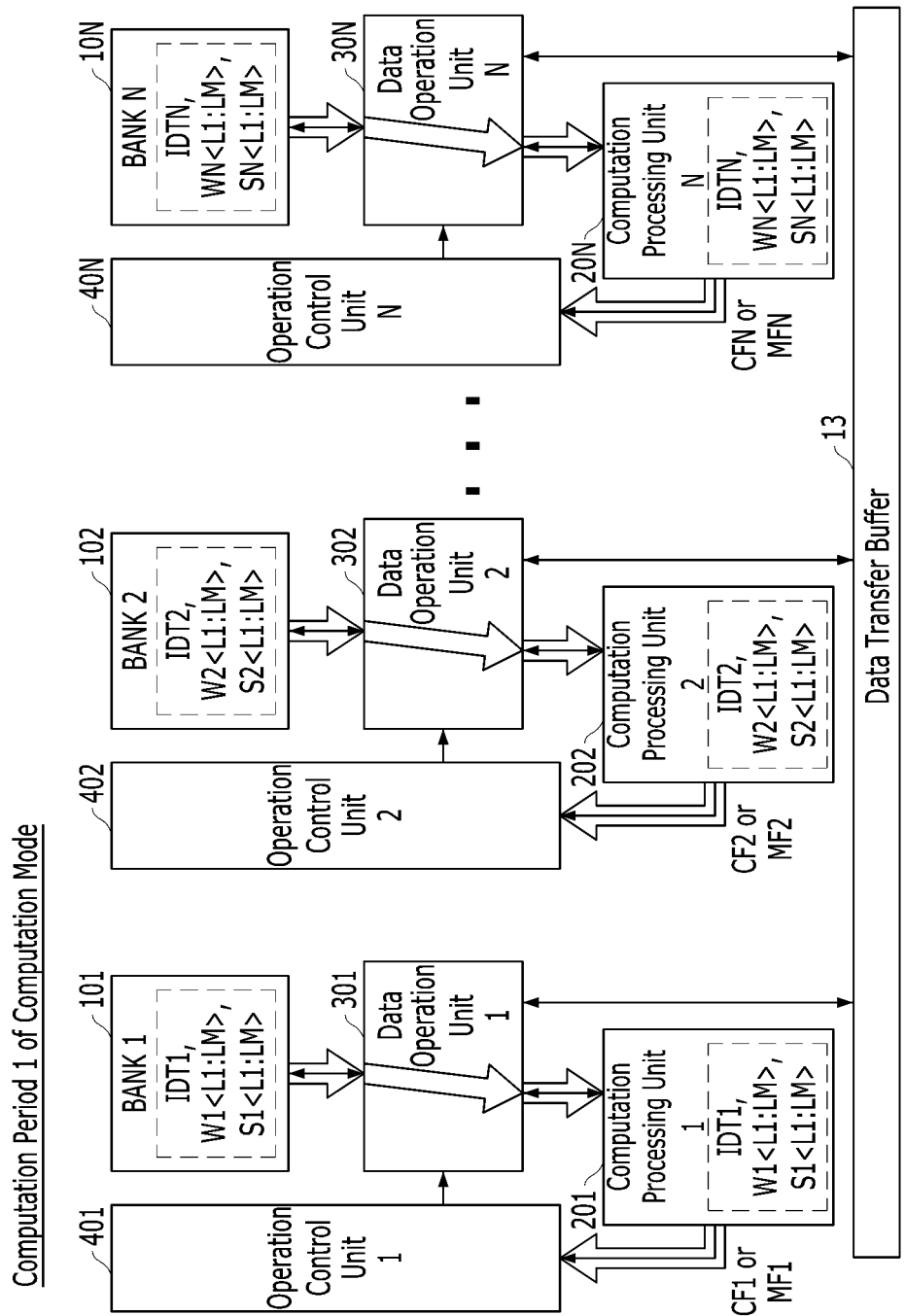

Referring to FIGS. 2 to 4 and 5A to 5E, the operation of the computation processing block 20<1:N> in the computation period, described with reference to FIG. 5B, will be described in more detail.

Figure 5C:
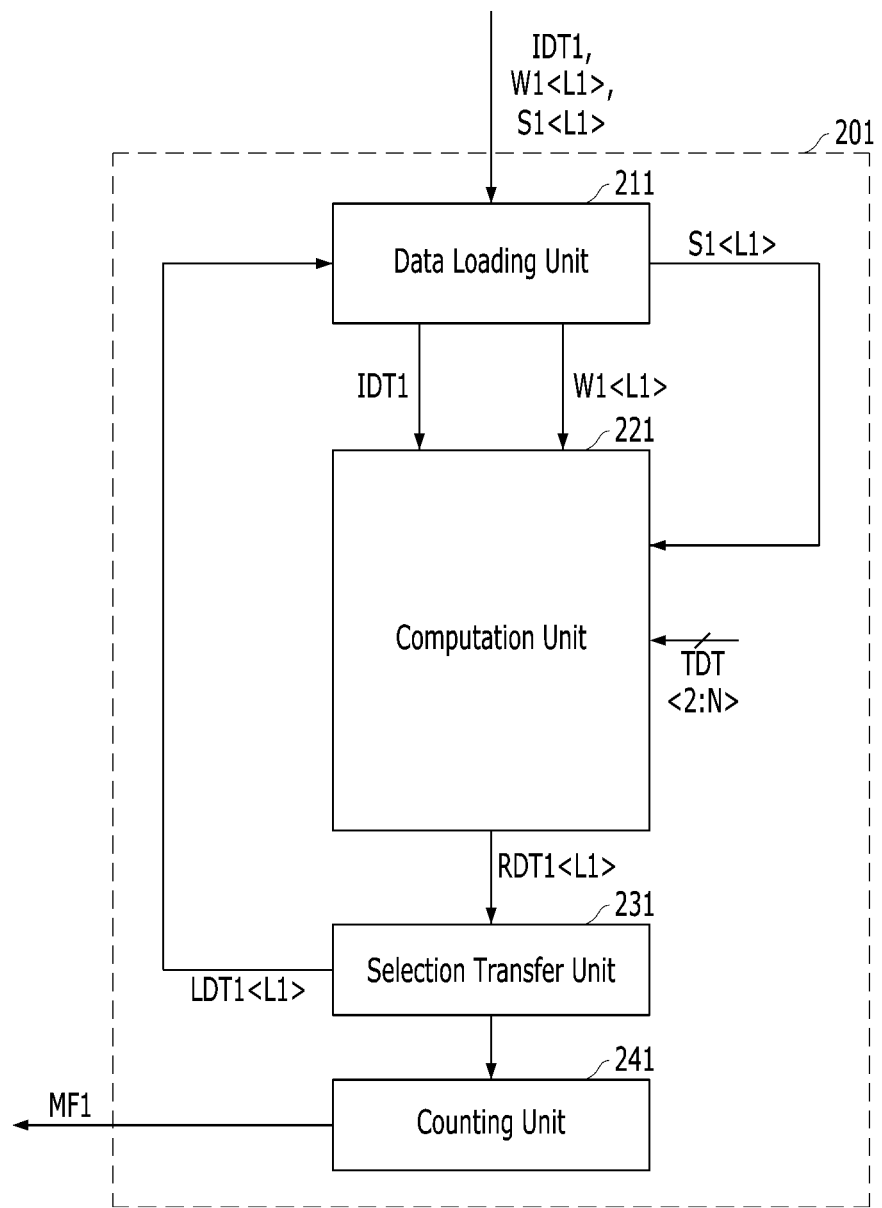

FIG. 5C illustrates the operation of the first computation processing unit 201 included in the computation processing block 20<1:N> in detail. Although not illustrated, the second to $N^{th}$ computation processing units 202 to 20N may operate in a similar manner to the first computation processing unit 201.

Specifically, the data loading unit 211 included in the first computation processing unit 201 may load the first input data IDT1, the first piece of first weight information W1<L1> and the first piece of first computation information S1<L1>, inputted from the first data operation unit 301, in response to the entry into the computation period.

Then, the computation unit 221 included in the first computation processing unit 201 may perform neural network computation on the first input data IDT1 using the first piece of first weight information W1<L1> and the first piece of first computation information S1<L1>, and generate first piece of first result data RDT1<L1> as the result. For example, the first computation unit 221 may generate the first piece of first result data RDT1<L1> by summing up a value, obtained by multiplying the first input data IDT1 by the first piece of first weight information W1<L1>, and the values of transfer data TDT<2:N> transferred from the second to $N^{th}$ computation processing units 202 to 20N according to the first piece of first computation information S1<L1>. This case corresponds to the case in which the computation processing block 20<1:N> performs N neural network computations, included in the first layer-level operation, on the N pieces of input data IDT1 to IDTN in parallel. Therefore, the transfer data TDT<2:N> transferred from the second to $N^{th}$ computation processing units 202 to 20N so as to be used for the neural network computation processing by the first computation processing unit 201 may be the second to $N^{th}$ pieces of input data IDT2 to IDTN.

Then, when the value of the first piece of first result data RDT1<L1> generated through the first computation unit 221 is equal to or more than a reference value, the first selection transfer unit 231 included in the first computation processing unit 201 may feed the first piece of first result data RDT1<L1> as the first piece of first loop data LDT1<L1> back to the first data loading unit 211. Furthermore, when the value of the first piece of first result data RDT1<L1> generated through the first computation unit 221 is less than the reference value, the first selection transfer unit 231 may ignore the first piece of first result data RDT1<L1>, generate the first piece of first loop data LDT1<L1> fixed to a specific value, and feed the generated data back to the first data loading unit 211.

The counting unit 241 included in the first computation processing unit 201 may count the number of times that the first selection transfer unit 231 transfers the loop data LDT1<L1> to the first data loading unit 211. When the counting value is smaller than M, the counting unit 241 may generate the intermediate completion signal MF1, and output the generated signal to the first operation control unit 401. When the counting value becomes M, the counting unit 241 may output the computation completion signal CF1 to the first operation control unit 401. Since the computation processing block 20<1:N> performs the N neural network computations included in the first layer-level operation in parallel, the counting value may be '1' smaller than M. Thus, the first counting unit 241 may generate the intermediate completion signal MF1 and output the generated signal to the first operation control unit 401.

As described above, the operation of the first computation processing unit 201 may be applied as the operations of the second to $N^{th}$ computation processing units 202 to 20N. Therefore, the computation processing block 20<1:N> may perform the N neural network computations in parallel on the N pieces of first input data IDT1 to IDTN loaded in response to the entry into the computation period, using the N pieces of first weight information W1<L1> to WN<L1> and the N pieces of first computation information S1<L1> to SN<L1>, and then generate the N pieces of first loop data LDT1<L1> to LDTN<L1> as the results. That is, the computation processing block 20<1:N> may perform the N neural network computations included in the first layer-level operation in parallel on the N pieces of first input data IDT1 to IDTN loaded in response to the entry into the computation period and then generate the N pieces of first loop data LDT1<L1> to LDTN<L1> as the results.

Figure 5D:
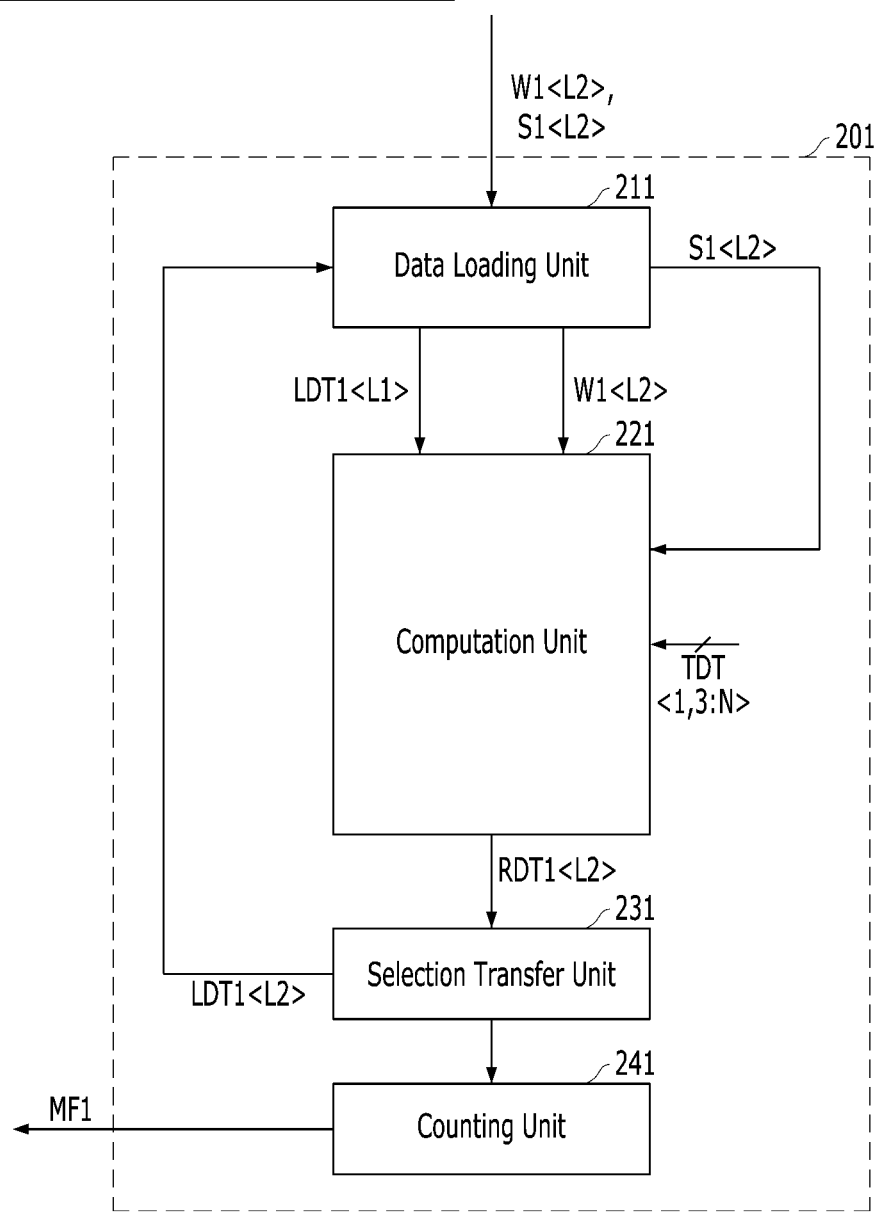

FIG. 5D illustrates the operation of the first computation processing unit 201 included in the computation processing block 20<1:N> in detail. Although not illustrated, the second to $N^{th}$ computation processing units 202 to 20N may operate in a similar manner to the first computation processing unit 201.

Specifically, the data loading unit 211 included in the first computation processing unit 201 may load the first piece of second weight information W1<L2> and the first piece of second computation information S1<L2>, inputted from the first data operation unit 301.

Then, the computation unit 221 included in the first computation processing unit 201 may perform neural network computation on the first piece of first loop data LDT1<L1> using the first piece of second weight information W1<L2> and the first piece of second computation information S1<L2>, and generate the first piece of second result data RDT1<L2> as the result. For example, the first computation unit 221 may generate the first piece of second result data RDT1<L2> by summing up a value, obtained by multiplying the first piece of first loop data LDT1<L1> by the first piece of second weight information W1<L2>, and the values of the transfer data TDT<2:N> transferred from the second to $N^{th}$ computation processing units 202 to 20N according to the first pieces of second computation information S1<L2>. This case corresponds to the case in which the computation processing block 20<1:N> performs the N neural network computations included in the first layer-level operation in parallel, and then performs N neural network computations, included in the second layer-level operation, in parallel on the N pieces of first loop data LDT1<L1> to LDTN<L1> generated as the results of the N neural network computations in the first layer-level operation. Therefore, the transfer data TDT<2:N> which are transferred from the second to $N^{th}$ computation processing units 202 to 20N so as to be used for the neural network computation by the first computation processing unit 201 may be the second to $N^{th}$ pieces of first loop data LDT2<L1> to LDTN<L1>.

Then, when the value of the first piece of second result data RDT1<L2> generated through the first computation unit 221 is equal to or more than the reference value, the first selection transfer unit 231 included in the first computation processing unit 201 may feed the first piece of second result data RDT1<L2> as the first piece of second loop data LDT1<L2> back to the first data loading unit 211. Furthermore, when the value of the first piece of second result data RDT1<L2> generated through the first computation unit 221 is less than the reference value, the first selection transfer unit 231 may ignore the first piece of second result data RDT1<L2>, generate the first piece of second loop data LDT1<L2> fixed to a specific value, and feed the generated data back to the first data loading unit 211.

The counting unit 241 included in the first computation processing unit 201 may count the number of times that the first selection transfer unit 231 transfers the loop data LDT1<L2> to the first data loading unit 211. When the counting value is smaller than M, the counting unit 241 may generate the intermediate completion signal MF1, and output the generated signal to the first operation control unit 401. When the counting value becomes M, the counting unit 241 may output the computation completion signal CF1 to the first operation control unit 401. Since the computation processing block 20<1:N> performs N neural network computations included in the second layer-level operation in parallel, the counting value may be '2' smaller than M. Thus, the first counting unit 241 may generate the intermediate completion signal MF1 and output the generated signal to the first operation control unit 401.

As described above, the operation of the first computation processing unit 201 may be applied as the operations of the second to $N^{th}$ computation processing units 202 to 20N. Therefore, the computation processing block 20<1:N> may perform N neural network computations in parallel on the N pieces of first loop data LDT1<L1> to LDTN<L1> generated as the results of the first layer-level operation, using the N pieces of second weight information W1<L2> to WN<L2> and the N pieces of second computation information S1<L2> to SN<L2>, and then generate the N pieces of second loop data LDT1<L2> to LDTN<L2> as the results. That is, the computation processing block 20<1:N> may perform the N neural network computations, included in the second layer-level operation, in parallel on the N pieces of first loop data LDT1<L1> to LDTN<L1> generated as the results of the first layer-level operation, and then generate the N pieces of second loop data LDT1<L2> to LDTN<L2> as the results.

In the same manner as described with reference to FIG. 5D, the computation processing block 20<1:N> may perform N neural network computations included in each of the third to $M^{th}$ layer-level operations in parallel, and then generate N pieces of corresponding loop data LDT1<Lx> to LDTN<Lx> (where, $3 \leq x \leq M$) as the results. In short, when performing each of the first to $M^{th}$ layer-level operations, the computation processing block 20<1:N> may load the N pieces of loop data, generated as the results of the previous layer-level operation, and use the N pieces of loop data of the previous layer-level operation to perform the N neural network computations in parallel to generate N pieces of loop data of the current layer-level operation.

Figure 5E:
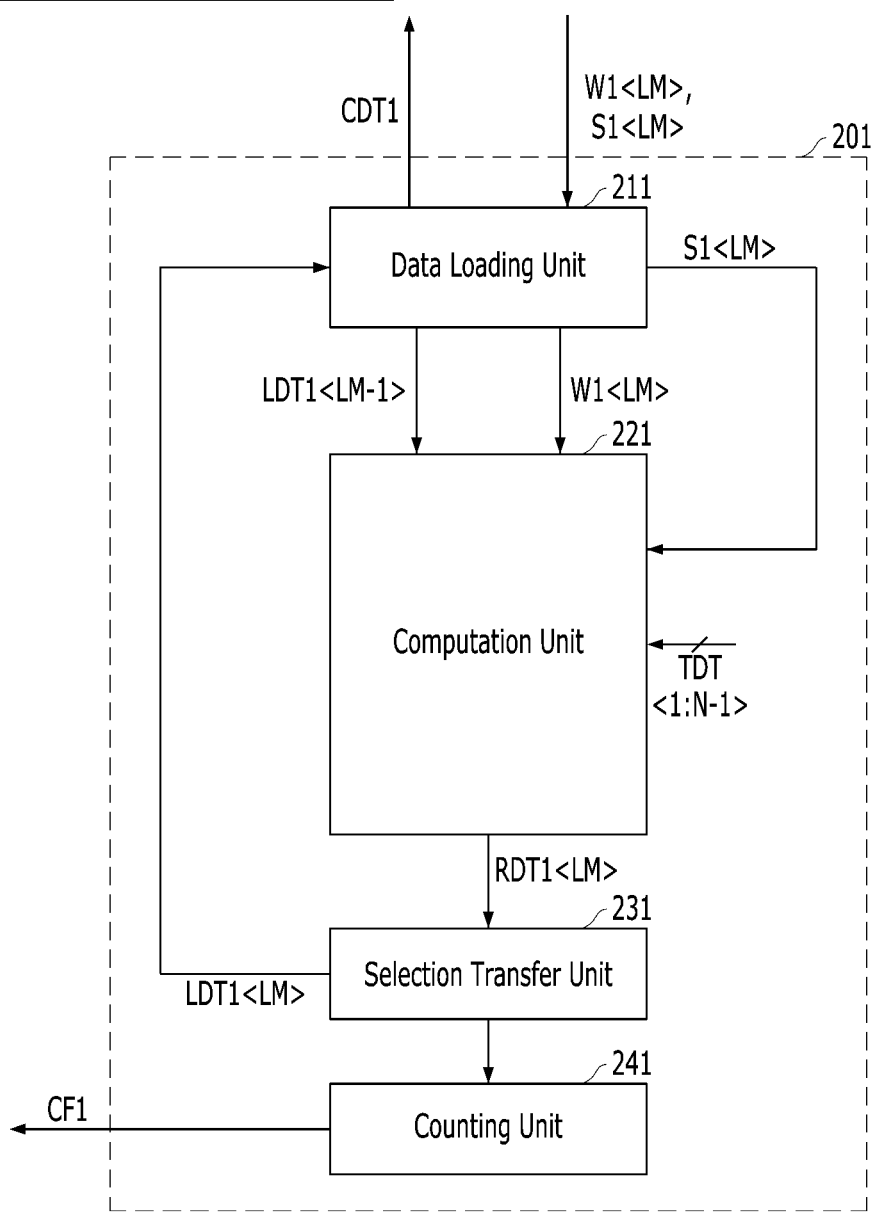
Figure 5F:
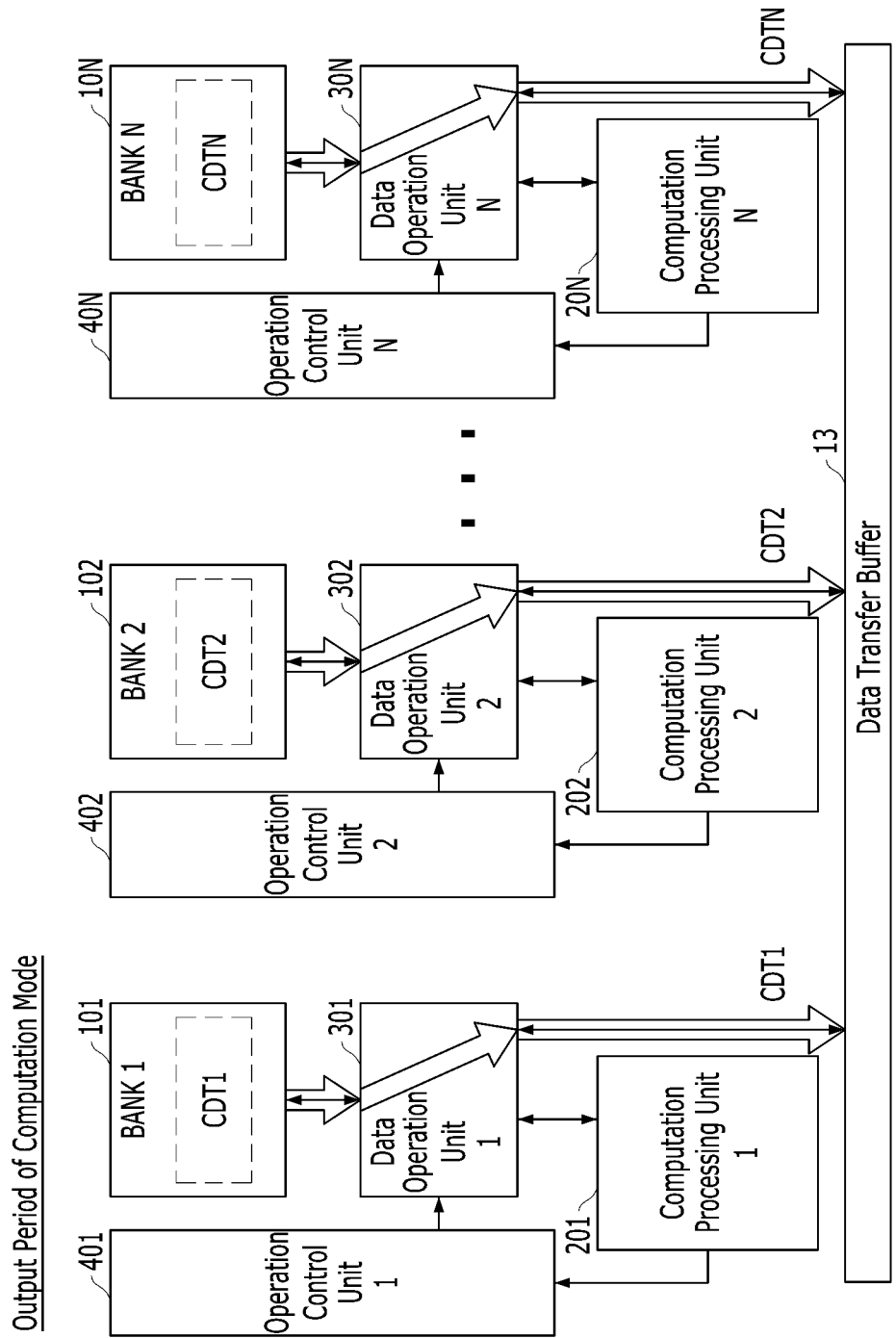

FIG. 5E illustrates the operation of the first computation processing unit 201 included in the computation processing block 20<1:N> in detail. Although not illustrated, the second to $N^{th}$ computation processing units 202 to 20N may operate in a similar manner to the first computation processing unit 201.

Specifically, the data loading unit 211 included in the first computation processing unit 201 may load the first piece of $M^{th}$ weight information W1<LM> and the first piece of $M^{th}$ computation information S1<LM>, inputted from the first data operation unit 301.

Then, the computation unit 221 included in the first computation processing unit 201 may perform neural network computation on the first $(M-1)^{th}$ loop data LDT1<LM-1> using the first piece of $M^{th}$ weight information W1<LM> and the first piece of $M^{th}$ computation information S1<LM>, and generate first piece of $M^{th}$ result data RDT1<LM> as the result. For example, the first computation unit 221 may generate the first piece of $M^{th}$ result data RDT1<LM> by summing up a value, obtained by multiplying the first $(M-1)^{th}$ loop data LDT1<LM-1> by the first piece of $M^{th}$ weight information W1<LM>, and the values of the transfer data TDT<2:N> transferred from the second to $N^{th}$ computation processing units 202 to 20N according to the first piece of $M^{th}$ computation information S1<LM>. This case corresponds to the case in which the computation processing block 20<1:N> performs the N neural network computations included in the $(M-1)^{th}$ layer-level operation in parallel and then performs the N neural network computations, included in the $M^{th}$ layer-level operation, in parallel on the N pieces of $(M-1)^{th}$ loop data LDT1<LM-1> to LDTN<LM-1> generated as the results of the N neural network computations in the $(M-1)^{th}$ layer-level operation. Therefore, the transfer data TDT<2:N> which are transferred from the second to $N^{th}$ computation processing units 202 to 20N so as to be used for the neural network computation by the first computation processing unit 201 may be the second to $N^{th}$ $(M-1)^{th}$ loop data LDT2<LM-1> to LDTN<LM-1>.

Then, when the value of the first piece of $M^{th}$ result data RDT1<LM> generated through the first computation unit 221 is equal to or more than the reference value, the first selection transfer unit 231 included in the first computation processing unit 201 may feed the first piece of $M^{th}$ result data RDT1<LM> as the first piece of $M^{th}$ loop data LDT1<LM> back to the first data loading unit 211. Furthermore, when the value of the first piece of $M^{th}$ result data RDT1<LM> generated through the first computation unit 221 is less than the reference value, the first selection transfer unit 231 may ignore the first piece of $M^{th}$ result data RDT1<LM>, generate the first piece of $M^{th}$ loop data LDT1<LM> fixed to a specific value, and feed the generated data back to the first data loading unit 211.

The counting unit 241 included in the first computation processing unit 201 may count the number of times that the first selection transfer unit 231 transfers the loop data LDT1<LM> to the first data loading unit 211. When the counting value is smaller than M, the counting unit 241 may generate the intermediate completion signal MF1, and output the generated signal to the first operation control unit 401. When the counting value becomes M, the counting unit 241 may output the computation completion signal CF1 to the first operation control unit 401. Since the computation processing block 20<1:N> performs N neural network computations included in the $M^{th}$ layer-level operation in parallel, the counting value may be M. Thus, the first counting unit 241 may generate the computation completion signal CF1 and output the generated signal to the first operation control unit 401.

Since the first counting unit 241 has generated the computation completion signal CF1 and outputted the generated signal to the first operation control unit 401, the first operation control unit 401 may recognize that the first piece of $M^{th}$ loop data LDT1<LM> fed back to the first data loading unit 211 is the first computation-completed data CDT1. Therefore, the first operation control unit 401 may receive the first piece of $M^{th}$ loop data LDT1<LM>, fed back to the first data loading unit 211, as the first computation-completed data CDT1.

As described above, the operation of the first computation processing unit 201 may be applied as the operations of the second to $N^{th}$ computation processing units 202 to 20N. Therefore, the computation processing block 20<1:N> may perform the N neural network computations in parallel on the N pieces of $(M-1)^{th}$ loop data LDT1<LM-1> to LDTN<LM-1> generated as the results of the $(M-1)^{th}$ layer-level operation, using the N pieces of $M^{th}$ weight information W1<LM> to WN<LM> and the N pieces of $M^{th}$ computation information S1<LM> to SN<LM>, and then generate the N pieces of $M^{th}$ loop data LDT1<LM> to LDTN<LM> as the results. Furthermore, the computation processing 20<1:N> may generate the computation completion signal CF1 and output the generated signal to the operation control block 40<1:N>, such that the operation control block 40<1:N> receives the N pieces of $M^{th}$ loop data LDT1<LM> to LDTN<LM> generated through the computation processing block 20 as the N pieces of computation-completed data CDT1 to CDTN. That is, the computation processing block 20<1:N> may perform the N neural network computations included in the $M^{th}$ layer-level operation, in parallel on the N pieces of $(M-1)^{th}$ loop data LDT1<LM-1> to LDTN<LM-1> generated as the results of the $(M-1)^{th}$ layer-level operation, generate the N pieces of $M^{th}$ loop data LDT1<LM> to LDTN<LM> as the results of the $M^{th}$ layer-level operation, and then output the N pieces of $M^{th}$ loop data LDT1<LM> to LDTN<LM>, as the N pieces of computation-completed data CDT1 to CDTN.

In short, the computation processing 20<1:N> may repeatedly perform the layer-level operations M times on the N pieces of input data IDT1 to IDTN in a loop or perform one network-level operation, and then output the N pieces of computation-completed data CDT1 to CDTN as the results of the M layer-level operations or the single network-level operation.

Therefore, the operation control block 40 may control the data operation block 30 to store the N pieces of computation-completed data CDT1 to CDTN transferred from the computation processing block 20<1:N> respectively in the N memory banks 101 to 10N, in response to the address inputted through the address input buffer 12 and the computation completion signals CF<1:N> transferred from the computation processing block 20<1:N>.

Referring to FIGS. 2 to 4 and 5A to 5F, the MRS included in the operation control block 40<1:N> may exit from the computation period and then enter the output period, in response to a computation completion command (not illustrated) inputted through the command input buffer 11.

Specifically, the operation control block 40 may control the data operation block 30 to read the N pieces of computation-completed data CDT1 to CDTN stored in the N memory banks 101 to 10N and output the read data through the data transfer buffer 13, in response to an address inputted through the address input buffer 12 in the output period.

Figure 6A:
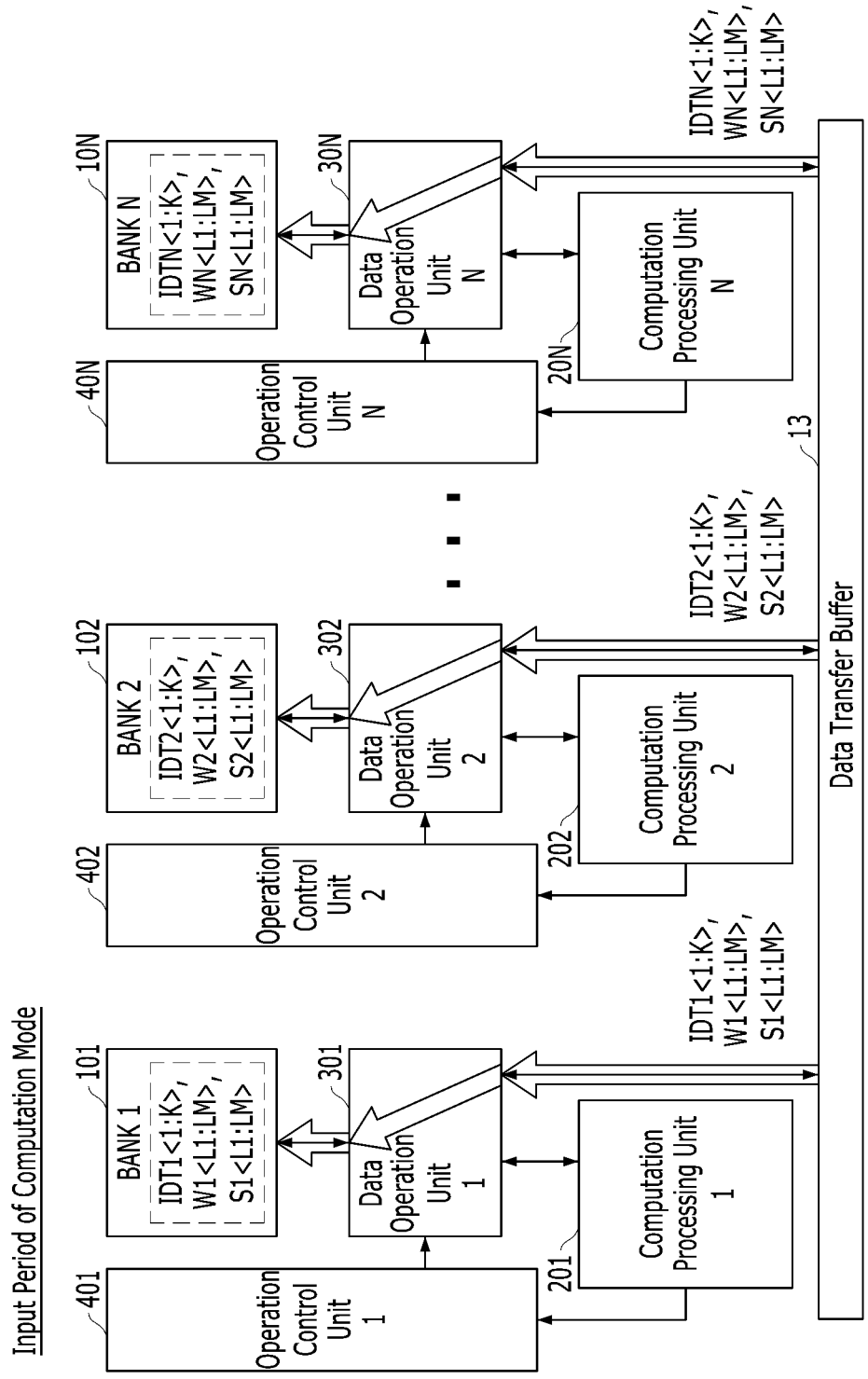
FIGS. 6A to 6C are diagrams for describing another example of the computation mode operation of a memory device in accordance with an embodiment.
Figure 6B:
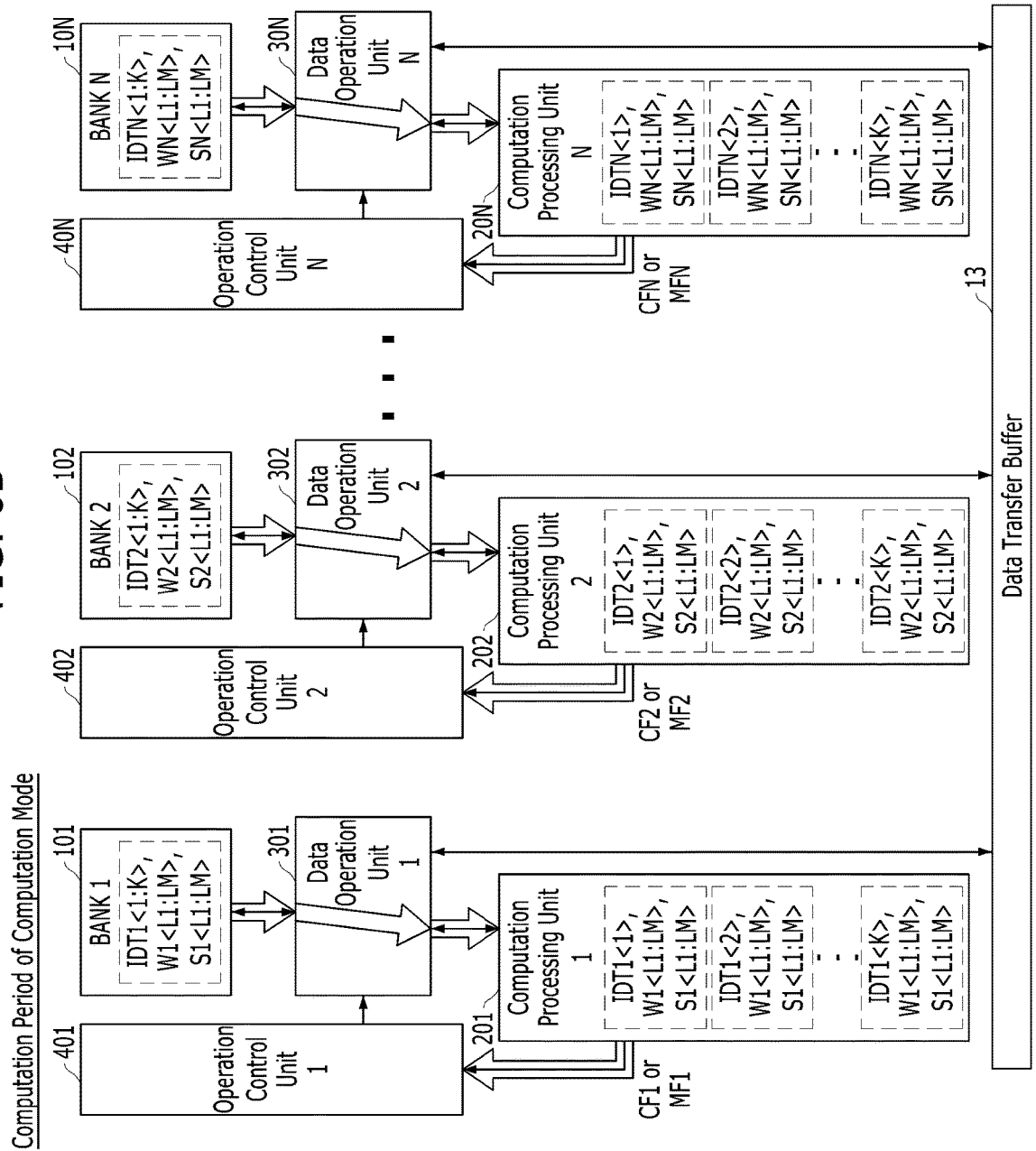
Figure 6C:
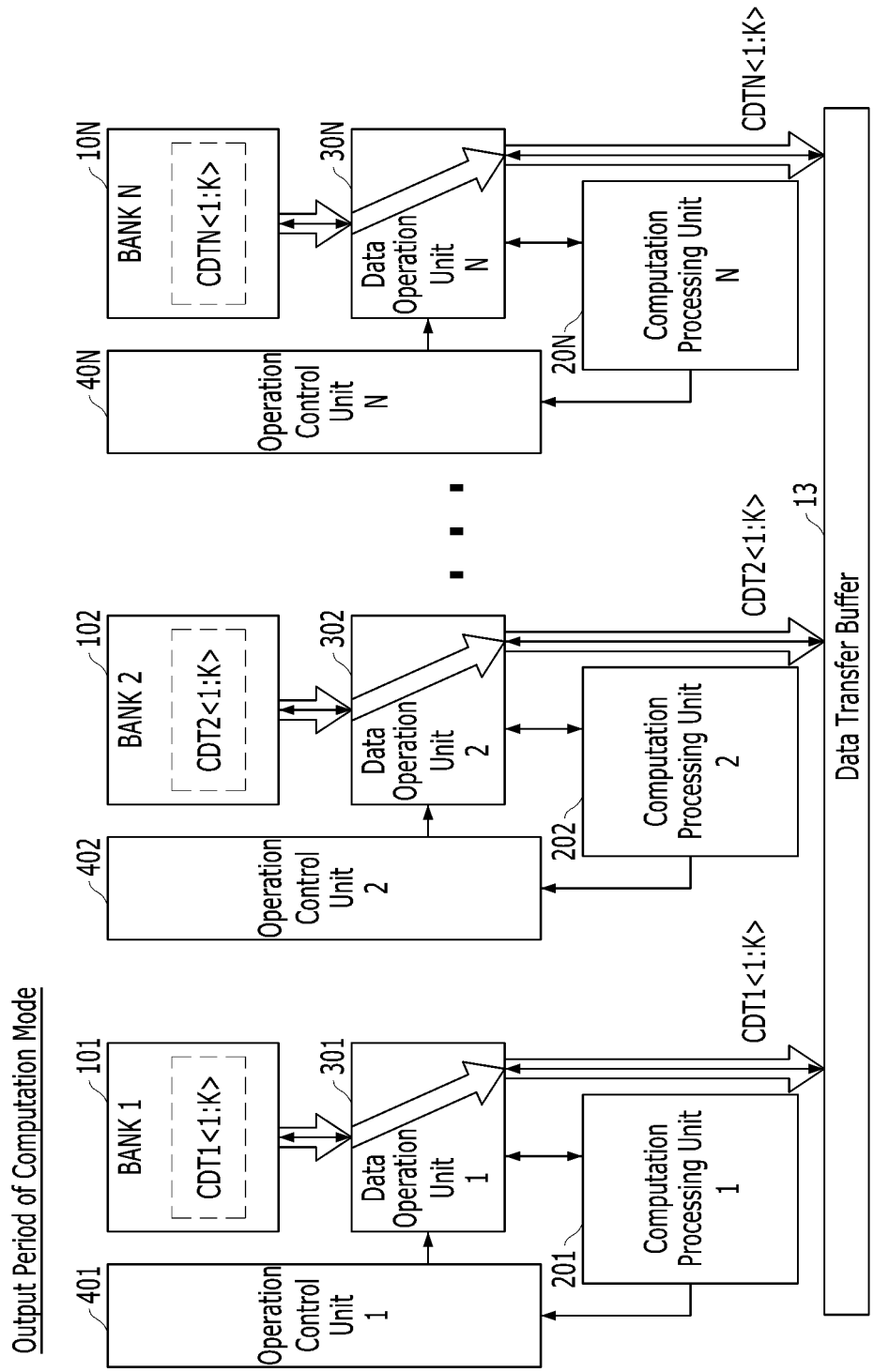

FIGS. 6A to 6C are diagrams for describing another example of the computation mode operation of the memory device in accordance with an embodiment.

Compared to the embodiment of FIGS. 5A to 5F, the input data IDTy (where, 1≤y≤N) may have K pieces represented as IDTy<1:K> in the embodiment of FIGS. 6A to 6C.

Similarly, the computation-completed data CDTy in the embodiment of FIGS. 5A to 5F may have K pieces represented as CDTy<1:K> in the embodiment of FIGS. 6A to 6C.

In the embodiment of FIGS. 6A to 6C, the network-level operation may be sequentially repeated K times by units of the N pieces of input data IDT1<z> to IDTN<z> (where, 1≤z≤K) to sequentially generate the N pieces of computation-completed data CDT1<z> to CDTN<z>.

Upon completion of the K network-level operations (or a single expanded network-level operation, which is described later) based on K groups from the N pieces of input data IDT1<1> to IDTN<1> to the N pieces of input data IDT1<K> to IDTN<K>, K groups may be generated from the N pieces of computation-completed data CDT1<1> to CDTN<1> to the N pieces of computation-completed data CDT1<K> to CDTN<K>.

FIGS. 2 to 4 and 6A to 6C are based on the supposition that K groups from the N pieces of input data IDT1<1> to IDTN<1> to the N pieces of input data IDT1<K> to IDTN<K> are inputted to the memory device 10 and stored in the N memory banks 101 to 10N by K groups of the input data IDTy<1> to IDTy<K>. Furthermore, FIGS. 2 to 4 and 6A to 6C are based on the supposition that the K groups from the N pieces of input data IDT1<1> to IDTN<1> to the N pieces of input data IDT1<K> to IDTN<K> stored in the respective N memory banks 101 to 10N by K groups of the input data IDTy<1> to IDTy<K> are repeatedly read K times in parallel (i.e., IDT1<1>, IDT2<1>, ..., IDTN<1> through first repetition of the read, ..., IDT1<2>, IDT2<2>, ..., IDTN<2> through second repetition of the read, ..., IDT1<1>, IDT2<K>, ..., IDTN<K> through Kth repetition of the read) by N pieces of input data IDT1<z> to IDTN<z>, and the computation processing unit 20<1:N> generates N pieces of computation-completed data CDT1<z> to CDTN<z> by repeating layer-level operations M times in a loop or performing one network-level operation whenever N pieces of input data IDT1<z> to IDTN<z> are read, and generates K groups from the N pieces of computation-completed data CDT1<1> to CDTN<1> to the N pieces of computation-completed data CDT1<K> to CDTN<K> by performing an expanded network-level operation indicating an operation of performing the network-level operation K times in a row.

Referring to FIGS. 2 to 4 and 6A, the MRS included in the operation control block 40<1:N> may enter the input period in response to the computation input command (not illustrated) inputted through the command input buffer 11.

The operation control block 40<1:N> may control the data operation block 30<1:N> to store the K groups from the N pieces of input data IDT1<1> to IDTN<1> to the N pieces of input data IDT1<K> to IDTN<K>, (N*M) pieces of weight information W1<L1:LM> to WN<L1:LM> and (N*M) pieces of computation information S1<L1:LM> to SN<L1:LM>, inputted through the data transfer buffer 13, in the N memory banks 101 to 10N in response to an address inputted through the address input buffer 12 in the input period.

Specifically, the first operation control unit 401 may control the first data operation unit 301 to store the first pieces of K groups of the input data IDT1<1> to IDT1<K>, the first M pieces of weight information W1<L1:LM> and the first M pieces of computation information S1<L1:LM>, inputted through the data transfer buffer 13, in the first memory bank 101 in the input period. Similarly, the second operation control unit 402 may control the second data operation unit 302 to store the second pieces of K groups of the input data IDT2<1> to IDT2<K>, the second M pieces of weight information W2<L1:LM> and the second M pieces of computation information S2<L1:LM>, inputted through the data transfer buffer 13, in the second memory bank 102 in the input period. In this way, the third to $N^{th}$ operation control units 403 to 40N may control the third to $N^{th}$ data operation units 303 to 30N to store the K groups from third to $N^{th}$ pieces of input data IDT3<1> to IDTN<1> to IDT3<K> to IDTN<K>, the third to $N^{th}$ M pieces of weight information W3<L1:LM> to WN<L1:LM> and the third to $N^{th}$ M pieces of computation information S3<L1:LM> to SN<L1:LM>, inputted through the data transfer buffer 13, in the third to $N^{th}$ memory banks 103 to 10N, respectively, in the input period.

Referring to FIGS. 2 to 4 and 6B, the MRS included in the operation control block 40<1:N> may exit from the input period and then enter the computation period, in response to the computation start command (not illustrated) inputted through the command input buffer 11.

The operation control block 40<1:N> may control the data operation block 30<1:N> to read the K groups from the N pieces of input data IDT1<1> to IDTN<1> to the N pieces of input data IDT1<K> to IDTN<K>, the (N*M) pieces of weight information W1<L1:LM> to WN<L1:LM> and the (N*M) pieces of computation information S1<L1:LM> to SN<L1:LM>, stored in the N memory banks 101 to 10N, and transfer the read data and information to the computation processing block 20<1:N>, in response to an address inputted through the address input buffer 12 in the computation period.

Specifically, after entering the computation period, the operation control block 40<1:N> may repeat the loading operation M times to correspond to the network-level operation of the computation processing block 20<1:N>, a single loading operation corresponding to a single layer-level operation of the computation processing block 20 and indicating an operation of controlling the data operation block 30<1:N> to read N pieces of weight information W1<Lx> to WN<Lx> and N pieces of computation information S1<Lx> to SN<Lx>, among the (N*M) pieces of weight information W1<L1:LM> to WN<L1:LM> and the (N*M) pieces of computation information S1<L1:LM> to SN<L1:LM> in parallel from the N memory banks 101 to 10N and then controlling the data operation block 30 to load the read information W1<Lx> to WN<Lx> and S1<Lx> to SN<Lx> to the computation processing unit 20<1:N>, where x is any number from 1 to M.

Furthermore, after entering the computation period, the operation control 40<1:N> may repeat an expanded loading operation K times to correspond to the expanded network-level operation of the computation processing block 20<1:N>, a single expanded loading operation indicating an operation of controlling the data operation block 30<1:N> to load N pieces of input data IDT1<z> to IDTN<z> to the computation processing block 20, the N pieces of input data IDT1<z> to IDTN<z> being read in parallel from the N memory banks 101 to 10N so as to correspond to the network-level operation of the computation processing block 20<1:N>, among the K groups from the N pieces of input data IDT1<1> to IDTN<1> to the N pieces of input data IDT1<K> to IDTN<K> stored in the N memory banks 101 to 10N.

The operation control block 40<1:N> may perform the first loading operation, among the loading operations which are repeated M times to correspond to the network-level operation of the computation processing block 20<1:N>, in response to the N pieces of input data IDT1<z> to IDTN<z> read from the N memory banks 101 to 10N in parallel. The operation control block 40<1:N> may perform the second to $M^{th}$ loading operations, among the loading operations which are repeated M times to correspond to the network-level operation of the computation processing block 20<1:N>, in response to the intermediate completion signals MF<1:N> transferred from the computation processing block 20<1:N>, respectively.

When the computation completion signals CF<1:N> and the N pieces of computation-completed data CDT1<z> to CDTN<z> are outputted as the results of the network-level operation by the computation processing block 20<1:N>, the operation control block 40<1:N> may repeatedly perform an expanded storing operation K times to correspond to the expanded network-level operation, the expanded storing operation indicating an operation of controlling the data operation block 30<1:N> to store the N pieces of computation-completed data CDT1<z> to CDTN<z> in the N memory banks 101 to 10N, respectively. Through this operation, the operation control block 40<1:N> may control the data operation block 30<1:N> to store the K groups from the N pieces of computation-completed data CDT1<1> to CDTN<1> to the N pieces of computation-completed data CDT1<K> to CDTN<K> in the respective N memory banks 101 to 10N by K groups of computation completed data CDTy<1> to CDTy<K>, the K groups from the N pieces of computation-completed data CDT1<1> to CDTN<1> to the N pieces of computation-completed data CDT1<K> to CDTN<K> corresponding to result data obtained by repeatedly performing the network-level operation K times through the computation processing block 20<1:N>, i.e. result data obtained by performing one expanded network-level operation.

More specifically, after entering the computation period, the first operation control unit 401 may control the first data operation unit 301 to read the first piece of first input data IDT1<1>, the first piece of first weight information W1<L1> and the first piece of first computation information S1<L1>, stored in the first memory bank 101, and transfer the read data and information to the first computation processing unit 201. Similarly, the second operation control unit 402 may control the second data operation unit 302 to read the second piece of first input data IDT2<1>, the second piece of first weight information W2<L1> and the second piece of first computation information S2<L1>, stored in the second memory bank 102, and transfer the read data and information to the second computation processing unit 202, in response to the entry into the computation period. In this way, the third to $N^{th}$ operation control units 403 to 40N may control the third to $N^{th}$ data operation units 303 to 30N to read the third to $N^{th}$ pieces of first input data IDT3<1> to IDTN<1>, the third to $N^{th}$ pieces of first weight information W3<L1> to WN<L1> and the third to $N^{th}$ pieces of first computation information S3<L1> to SN<L1>, stored in the third to $N^{th}$ memory banks 103 to 10N, and transfer the read data and information to the third to $N^{th}$ computation processing units 203 to 20N, respectively, in response to the entry into the computation period. As described above, the operation control block 40<1:N> may perform the first loading operation, among the loading operations which are repeated M times to correspond to the network-level operation of the computation processing block 20<1:N>, on the N pieces of first input data IDT1<1> to IDTN<1> in response to the entry into the computation period.

Then, the first operation control unit 401 may control the first data operation unit 301 to read the first piece of second weight information W1<L2> and the first piece of second computation information S1<L2>, stored in the first memory bank 101, and transfer the read information to the first computation processing unit 201, in response to the intermediate completion signal MF1 transferred from the first computation processing unit 201. Similarly, the second operation control unit 402 may control the second data operation unit 302 to read the second piece of second weight information W2<L2> and the second piece of second computation information S2<L2>, stored in the second memory bank 102, and transfer the read information to the second computation processing unit 202, in response to the intermediate completion signal MF2 transferred from the second computation processing unit 202. In this way, the third to $N^{th}$ operation control units 403 to 40N may control the third to $N^{th}$ data operation units 303 to 30N to read the third to $N^{th}$ pieces of second weight information W3<L2> to WN<L2> and the third to $N^{th}$ pieces of second computation information S3<L2> to SN<L2>, stored in the third to $N^{th}$ memory banks 103 to 10N, and transfer the read information to the third to $N^{th}$ computation processing units 203 to 20N, respectively, in response to the intermediate completion signals MF<3:N> transferred from the third to $N^{th}$ computation processing units 203 to 20N. As described above, the operation control block 40<1:N> may perform the second loading operation, among the loading operations which are repeated M times to correspond to the network-level operation of the computation processing block 20<1:N>, in response to the intermediate completion signal MF<1:N> transferred from the computation processing block 20<1:N>. The third to $M^{th}$ loading operations may be performed in the same manner as the second loading operation.

Then, when the computation completion signal CF1 and the first piece of first computation-completed data CDT1<1> are outputted from the first computation processing unit 201, the first operation control unit 401 may control the first data operation unit 301 to store the first piece of first computation-completed data CDT1<1> in the first memory bank 101. Similarly, when the computation completion signal CF2 and the second piece of first computation-completed data CDT2<1> are outputted from the second computation processing unit 202, the second operation control unit 402 may control the second data operation unit 302 to store the second piece of first computation-completed data CDT2<1> in the second memory bank 102. In this way, when the computation completion signals CF<3:N> and the third to $N^{th}$ pieces of first computation-completed data CDT3 to CDTN are outputted from the third to $N^{th}$ computation processing units 203 to 20N, respectively, the third to $N^{th}$ operation control units 403 to 40N may control the third to $N^{th}$ data operation units 303 to 30N to store the third to $N^{th}$ pieces of first computation-completed data CDT3<1> to CDTN<1> in the third to $N^{th}$ memory banks 103 to 10N, respectively. As described above, when the computation completion signals CF<1:N> and the N pieces of first computation-completed data CDT1<1> to CDTN<1> are outputted as the results of the network-level operation by the computation processing block 20<1:N>, the operation control block 40<1:N> may control the data operation block 30<1:N> to store the N pieces of first computation-completed data CDT1<1> to CDTN<1> in the N memory banks 101 to 10N, respectively.

The above-described network-level operation of the computation processing block 20 may be repeated whenever the operation control block 40 performs the expanded loading operation of reading the N pieces of input data IDT1<z> to IDTN<z>, among the K groups from the N pieces of input data IDT1<1> to IDTN<1> to the N pieces of input data IDT1<K> to IDTN<K> in parallel from the N memory banks 101 to 10N, respectively, and thus performed K times. In other words, the computation processing block 20<1:N> may perform one expanded network-level operation by repeatedly performing the network-level operation K times. The computation processing block 20<1:N> may redundantly use the (N*M) pieces of weight information W1<L1:LM> to WN<L1:LM> and the (N*M) pieces of computation information S1<L1:LM> to SN<L1:LM> during the network-level operations which are repeated K times. For example, the computation processing block 20<1:N> may perform neural network computation using the (N*M) pieces of weight information W1<L1:LM> to WN<L1:LM> and the (N*M) pieces of computation information S1<L1:LM> to SN<L1:LM> during the first network-level operation, and then perform neural network computation by redundantly using the (N*M) pieces of weight information W1<L1:LM> to WN<L1:LM> and the (N*M) pieces of computation information S1<L1:LM> to SN<L1:LM> even during the second network-level operation following the first network-level operation. In this way, the computation processing block 20<1:N> may perform neural network computation by redundantly using the (N*M) pieces of weight information W1<L1:LM> to WN<L1:LM> and the (N*M)

pieces of computation information S1<L1:LM> to SN<L1:LM> until the Kth network-level operation.

Referring to FIGS. 2 to 4 and 6C, the MRS included in the operation control block 40<1:N> may exit from the computation period and then enter the output period, in response to the computation completion command (not illustrated) inputted through the command input buffer 11.

Specifically, the operation control block 40<1:N> may repeat an expanded read operation K times (CDT1<1>, CDT2<1>, . . . , CDTN<1>, . . . , CDT1<2>, CDT2<2>, . . . , CDTN<2>, . . . , CDT1<1>, CDT2<K>, . . . , CDTN<K>) and repeat an expanded output operation K times (CDT1<1>, CDT2<1>, . . . , CDTN<1>, . . . , CDT1<2>, CDT2<2>, . . . , CDTN<2>, . . . , CDT1<1>, CDT2<K>, . . . , CDTN<K>) in the output period. The expanded read operation may indicate an operation of reading the K groups from the N pieces of computation-completed data CDT1<1> to CDTN<1> to the N pieces of computation-completed data CDT1<K> to CDTN<K> stored in the N memory banks 101 to 10N in parallel by N pieces of computation-completed data CDT1<z> to CDTN<z> in response to an address inputted through the address input buffer 12, and the eight operation may indicate an operation of controlling the data operation block 30<1:N> to output the N pieces of computation-completed data CDT1<z> to CDTN<z>, read through the expanded read operation, through the data transfer buffer 13.

Figure 7:
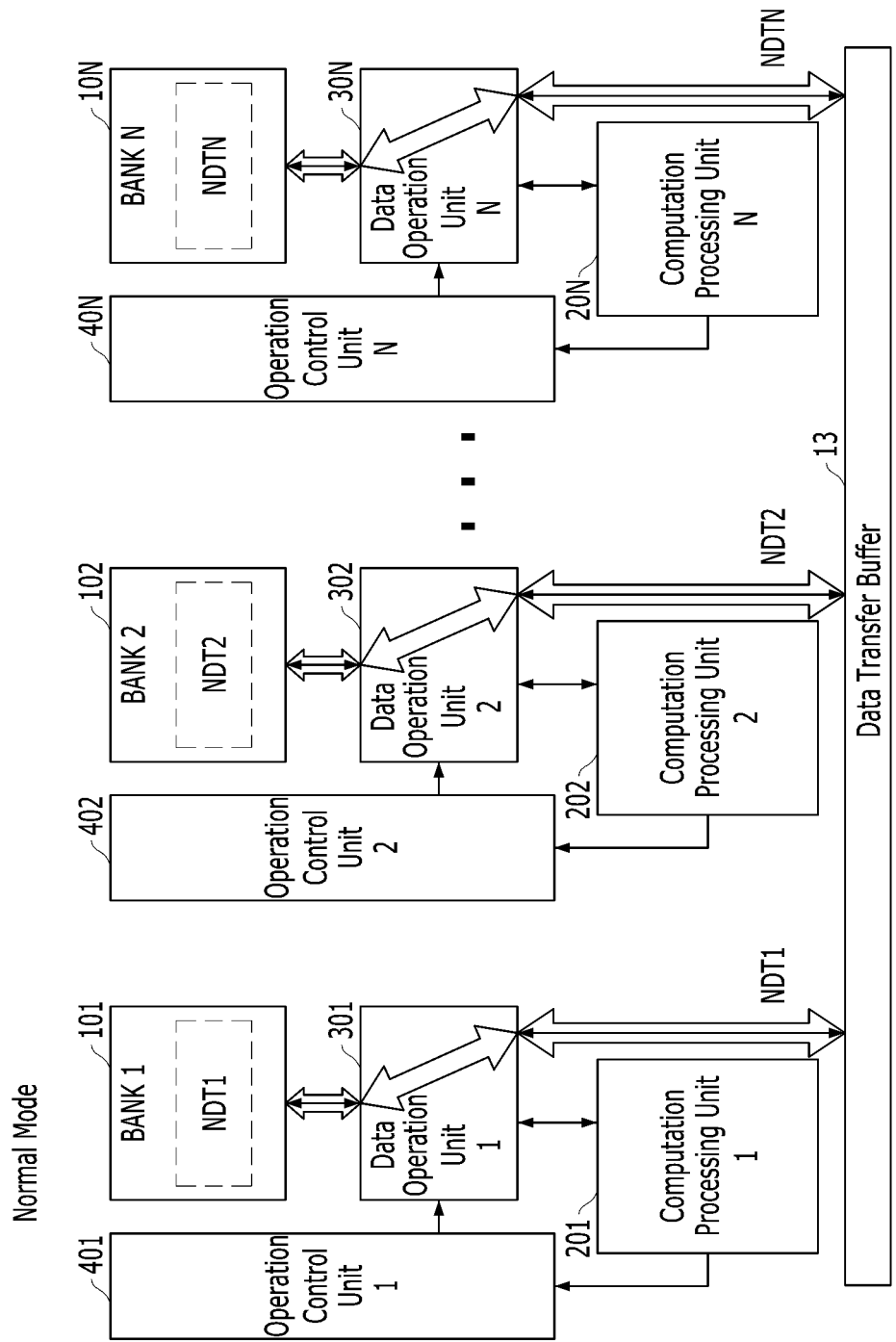
FIG. 7 is a diagram for describing a normal mode operation of the memory device in accordance with an embodiment.

FIG. 7 is a diagram for describing a normal mode operation of the memory device in accordance with an embodiment.

Referring to FIG. 7, the MRS included in the operation control block 40<1:N> may exit from the computation mode and then enter the normal mode, in response to a normal start command (not illustrated) inputted through the command input buffer 11.

Specifically, when a write command, a write address and write data NDT<1:N> are inputted through the command input buffer 11, the address input buffer 12 and the data transfer buffer 13, respectively, in the normal mode, the operation control block 40<1:N> may control the data operation block 30<1:N> to perform a write operation of storing the write data NDT<1:N> in a memory cell corresponding to the write address, among the N memory banks 101 to 10N.

Furthermore, when a read command and a read address are inputted through the command input buffer 11 and the address input buffer 12, respectively, in the normal mode, the operation control block 40<1:N> may control the data operation block 30<1:N> to read data NDT<1:N> stored in a memory cell corresponding to the read address, among the N memory banks 101 to 10N, and to output the read data through the data transfer buffer 13.

The operation control block 40<1:N> may control the data operation block 30<1:N> to input/output no data to/from the computation processing block 20<1:N> in the normal mode. Through this operation, the computation processing block 20<1:N> may be deactivated in the normal mode, and perform no operations.

In accordance with an embodiment, the neural network processing circuit may be included in the memory device, and thus enable the memory device to perform neural network computation for itself without intervention of a host or memory controller after entering the computation mode.

Furthermore, since the memory banks (including the plurality of memory cells) and the neural network processing circuit, which are included in the memory device, share a data input/output buffer, the use of the memory device may be selected through an operation of controlling whether to activate the neural network processing circuit.

Although various embodiments have been illustrated and described, it will be apparent to those skilled in the art that various changes and modifications may be made without departing from the spirit and scope of the invention as defined in the following claims. The present invention encompasses all such changes and modifications that fall within the scope of the claims.

What is claimed is:

1. A memory device comprising:
N cell array regions;
a computation processing block suitable for generating computation-completed data by performing a network-level operation on input data during a computation period of a computation mode, the network-level operation indicating an operation of repeating a layer-level operation M times in a loop, the layer-level operation indicating an operation of loading N pieces of neural network processing information in parallel from the N cell array regions and performing N neural network computations in parallel;
a data operation block suitable for storing the input data and (M*N) pieces of neural network processing information, inputted through a data transfer buffer, in the N cell array regions in an input period, and outputting the computation-completed data through the data transfer buffer in an output period; and
an operation control block suitable for controlling entry into and exit from the input period, the computation period and the output period and controlling the computation processing block and the data operation block, in response to a command and address inputted through an input buffer, where N and M are natural numbers equal to or more than 2,
wherein the (M*N) pieces of neural network processing information comprise (M*N) pieces of weight information and (M*N) pieces of computation information, and wherein the operation control block controls the data operation block to store M pieces of weight information and M pieces of computation information in the respective N cell array regions in the input period.

2. The memory device of claim 1,
wherein in a normal mode, the data operation block stores data inputted through the data transfer buffer in the N cell array regions during a write operation, and reads data of the N cell array regions and outputs the read data through the data transfer buffer during a read operation, and
wherein the operation control block controls entry into and exit from the normal mode and the data operation block in response to the command and address inputted through the input buffer.

3. The memory device of claim 1, wherein the operation control block enters the input period in response to a computation input command inputted through the input buffer, and controls the data operation block to store the input data, the M pieces of weight information and the M pieces of computation information in the respective N cell array regions in response to an address inputted through the input buffer.

4. The memory device of claim 3, wherein the operation control block exits the input period and then enters the computation period in response to a computation start command inputted through the input buffer, controls the layer-level operation and the network-level operation in response to an address inputted through the input buffer, and controls the data operation block to store the computation-completed data in the N cell array regions in response to a computation completion signal transferred from the computation processing block.

5. The memory device of claim 4, wherein the operation control block exits the computation period and then enters the output period in response to a computation completion command inputted through the input buffer, and controls the data operation block to read the computation-completed data from the N cell array regions in response to an address inputted through the input buffer, and output the read computation-completed data through the data transfer buffer.

6. The memory device of claim 5, wherein after entering the computation period, the operation control block repeats a loading operation M times to correspond to the network-level operation, the loading operation indicating an operation of controlling the data operation block to read N pieces of weight information and N pieces of computation information, among the (M*N) pieces of weight information and the (M*N) pieces of computation information stored in the N cell array regions, in parallel from the N cell array regions so as to correspond to the layer-level operation, and then load the read information to the computation processing block.

7. The memory device of claim 6, wherein the operation control block performs the first loading operation in response to the entry into the computation period, and performs the second and $M^{th}$ loading operations in response to intermediate completion signals transferred from the computation processing block, respectively.

8. The memory device of claim 7,
wherein the input data comprise N pieces of first input data, and the computation-completed data comprise N pieces of first computation-completed data, wherein after entering the input period, the operation control block controls the data operation block to store the first input data in the respective N cell array regions by one first input data.

9. The memory device of claim 8, wherein the operation control block controls the data operation block to:
load the N pieces of first input data, read in parallel from the respective N cell array regions, to the computation processing block in response to the entry into the computation period, and
store the N pieces of first computation-completed data in the respective N cell array regions by one first computation-completed data when the computation completion signal and the N pieces of first computation-completed data are outputted from the computation processing block.

10. The memory device of claim 9, wherein the operation control block controls the data operation block to:
read, in response to entry into the output period, the N pieces of first computation-completed data in parallel from the N cell array regions, and
output the read N pieces of first computation-completed data through the data transfer buffer.

11. The memory device of claim 9,
wherein the computation processing block generates N pieces of loop data by performing N neural network computations, included in the first layer-level operation, in parallel on the N pieces of first input data loaded in response to the entry into the computation period,
wherein during each of the second to $M^{th}$ layer-level operations, the computation processing block loads the N pieces of loop data, generated as the results of the previous layer-level operation, in the current layer-level operation, and performs the N neural network computations in parallel,
wherein the computation processing block outputs the N pieces of loop data, generated as the result of the $M^{th}$ layer-level operation, as the N pieces of first computation-completed data, which are the results of the network-level operation, to the data operation block.

12. The memory device of claim 11,
wherein the computation processing block counts the number of times that the layer-level operation is completed,
wherein until the counting value becomes (M−1), the computation processing block generates the intermediate completion signal whenever the counting value is increased by 1 and outputs the intermediate completion signal to the operation control block,
wherein when the counting value becomes M, the computation processing block generates the computation completion signal and outputs the computation completion signal to the operation control block.

13. The memory device of claim 7,
wherein the input data comprise (K*N) pieces of second input data, and the computation-completed data comprise (K*N) pieces of second computation-completed data,
wherein after entering the input period, the operation control block controls the data operation block to store the K pieces of second input data in each of the N cell array regions,
wherein the computation processing block generates N pieces of second computation-completed data among the (K*N) pieces of second computation-completed data by performing one network-level operation on N pieces of second input data among the (K*N) pieces of second input data, and generates the (K*N) pieces of second computation-completed data by performing an expanded network-level operation on the (K*N) pieces of second input data, the expanded network-level operation indicating an operation of performing the network-level operation K times in a row during the computation period, where K is a natural number equal to or more than 2.

14. The memory device of claim 13, wherein after entering the computation period, the operation control block repeats an expanded loading operation K times to correspond to the expanded network-level operation, the expanded loading operation indicating an operation of controlling the data operation block to load the N pieces of second input data, read in parallel from the N cell array regions so as to correspond to the network-level operation, to the computation processing block,
wherein when the computation completion signal and the N pieces of second computation-completed data of the (K*N) second computation-completed data are outputted from the computation processing block in response to the network-level operation, the operation control block repeats an expanded storing operation K times to correspond to the expanded network-level operation, the expanded storing operation indicating an operation of controlling the data operation block to store one second computation-completed data in each of the N cell array regions.

15. The memory device of claim 14, wherein the operation control block repeats an expanded read operation K times N and repeats an expanded output operation K times, wherein the expanded read operation indicates an operation of reading N pieces of second computation-completed data in parallel from the N cell array regions in response to the entry into the output period, and the expanded output operation indicates an operation of controlling the data operation block to output the N pieces of second computation-completed data, read through the expanded read operation, through the data transfer buffer.

16. The memory device of claim 13,
wherein after entering the computation period, the computation processing block generates N pieces of data by performing N neural network computations, included in the first layer-level operation, in parallel on the loaded N pieces of second input data among the (K*N) second input data,
wherein during each of the second to $M^{th}$ layer-level operations, the computation processing block loads the N pieces of data, generated as the results of the previous layer-level operation, in the current layer-level operation, and performs the N neural network computations in parallel,
wherein the computation processing block outputs the N pieces of data, generated as the result of the $M^{th}$ layer-level operation, as the N pieces of second computation-completed data which are the results of the network-level operation, to the data operation block.

17. The memory device of claim 16,
wherein the computation processing block counts the number of times that the layer-level operation is completed,
wherein until the counting value becomes (M−1), the computation processing block generates the intermediate completion signal whenever the counting value is increased by 1 and outputs the intermediate completion signal to the operation control block, wherein when the counting value becomes M, the computation processing block generates the computation completion signal, outputs the computation completion signal to the operation control block, and resets the counting value.

18. The memory device of claim 7,
wherein the computation processing block comprises N computation processing units corresponding to the respective N cell array regions,
wherein each of the N computation processing unit comprises:
a data loading unit suitable for loading the weight information and the computation information inputted through the data operation block and any of the data inputted through the data operation block and internal feedback loop data;
a computation unit suitable for performing neural network computation on the data loaded from the data loading unit and data transferred from the other (N−1) computation processing units except the corresponding computation unit, using the weight information and the computation information, and generating a result;
a selection transfer unit suitable for feeding the result as the loop data back to the data loading unit when a value indicative of the result is equal to or more than a reference value, and generating the loop data fixed to a specific value and feeding the loop data back to the data loading unit when the value of the result is less than the reference value; and
a counting unit suitable for counting the number of times that the selection transfer unit transfers the loop data to the data loading unit, generating the intermediate completion signal or the computation completion signal according to the counting value, and outputting the generated signal to the operation control block.

19. The memory device of claim 1,
wherein the data operation block comprises N data operation units corresponding to the respective N cell array regions,
wherein each of the N data operation units comprises:
a read/write operation unit suitable for writing data to a cell array region or reading data from a cell array region in response to a first control signal inputted from the operation control block; and
a path selector suitable for selecting a path of data transferred among the read/write operation unit, the data transfer buffer and the computation processing unit in response to a second control signal inputted from the operation control block.

* * * * *